United States Patent
Fuhr

(10) Patent No.: US 12,415,292 B2
(45) Date of Patent: Sep. 16, 2025

(54) STAINABLE LAMINATE PRODUCTS, COMPOSITIONS, AND METHODS OF MANUFACTURE

(71) Applicant: PRESSING DEVELOPMENTS, L.L.C., Georgetown, TX (US)

(72) Inventor: Adam Curtis Fuhr, Georgetown, TX (US)

(73) Assignee: PRESSING DEVELOPMENTS, L.L.C., Georgetown, TX (US)

( * ) Notice: Subject to any disclaimer, the term of this patent is extended or adjusted under 35 U.S.C. 154(b) by 917 days.

(21) Appl. No.: 16/967,727

(22) PCT Filed: Feb. 11, 2019

(86) PCT No.: PCT/US2019/017554
§ 371 (c)(1),
(2) Date: Aug. 5, 2020

(87) PCT Pub. No.: WO2019/157473
PCT Pub. Date: Aug. 15, 2019

(65) Prior Publication Data
US 2021/0040320 A1 Feb. 11, 2021

Related U.S. Application Data

(60) Provisional application No. 62/628,618, filed on Feb. 9, 2018.

(51) Int. Cl.
*B27N 3/00* (2006.01)
*B27N 3/20* (2006.01)
(Continued)

(52) U.S. Cl.
CPC ............. *B27N 3/002* (2013.01); *B27N 3/20* (2013.01); *B32B 21/06* (2013.01); *B32B 21/08* (2013.01);
(Continued)

(58) Field of Classification Search
CPC ....... B32B 27/205; B32B 27/42; B32B 21/06; B32B 21/08; C09D 161/24; C09D 161/28; C09D 163/00–10
See application file for complete search history.

(56) References Cited

U.S. PATENT DOCUMENTS 2,537,520 A * 1/1951 Eger .................. C08K 3/26
260/998.16
3,135,643 A * 6/1964 Michl .................. B44C 5/0476
156/278

(Continued)

FOREIGN PATENT DOCUMENTS

| | | |
|---|---|---|
| EP | 1 941 322 A1 | 7/2008 |
| KR | 10-2006-0078965 A | 7/2006 |
| KR | 101753523 B1 * | 7/2017 |

OTHER PUBLICATIONS

Partial machine translation of KR-101753523-B1 (generated Oct. 2, 2023).*

(Continued)

*Primary Examiner* — Kregg T Brooks
(74) *Attorney, Agent, or Firm* — Rodney J. Fuller; Scott H. Blackman; Fuller IP Law LLC

(57) ABSTRACT

The present disclosure describes laminate wood or wood products capable of retaining a wood stain or colorant. The unique resin binder formulations and products include porosity-promoting agents that result in the resin binder having a porous surface capable of being stained with a wood stain or other colorant, while still having the favorable properties of traditional laminate products. The methods of the invention produce a laminate wood or wood product that can be stained with a variety of stains and colorants after manufacturing to suit the individual builder's or homeowner's preference. The stainable laminate products may include a decorative paper layer sandwiched between a (Continued)

backing layer and a resin binder layer embedded with a porosity agent, such as, silica, wax, mica, calcium carbonate, silane, kaolin clay, crystalline silica, corn starch, feldspar, talc, or combinations thereof. The stainable resin binder layer optionally has a textured top surface.

5 Claims, 7 Drawing Sheets

(51) Int. Cl.
```
B32B 21/06      (2006.01)
B32B 21/08      (2006.01)
B32B 27/20      (2006.01)
B32B 27/42      (2006.01)
C08K 3/26       (2006.01)
C08K 3/36       (2006.01)
C08L 75/02      (2006.01)
C08L 79/02      (2006.01)
```
(52) U.S. Cl.
CPC ............ *B32B 27/205* (2013.01); *B32B 27/42* (2013.01); *C08K 3/26* (2013.01); *C08K 3/36* (2013.01); *C08L 75/02* (2013.01); *C08K 2003/265* (2013.01); *C08L 79/02* (2013.01)

(56) References Cited

U.S. PATENT DOCUMENTS

| | | | | |
|---|---|---|---|---|
| 3,525,664 A * | 8/1970 | Singer | ............... | D21H 27/28 |
| | | | | 156/279 |
| 3,684,649 A * | 8/1972 | Shelton | ............... | B27N 7/005 |
| | | | | 428/541 |
| 4,140,837 A * | 2/1979 | Drees | ............... | D21H 27/26 |
| | | | | 428/409 |
| 4,214,026 A * | 7/1980 | Ibata | ............... | H05K 1/036 |
| | | | | 156/244.17 |
| 5,552,353 A * | 9/1996 | Kwong | ............... | C04B 35/597 |
| | | | | 501/98.4 |
| 5,736,228 A | 4/1998 | Morris et al. | | |
| 6,077,614 A * | 6/2000 | Conti | ............... | C08G 12/38 |
| | | | | 428/524 |
| 2003/0071884 A1 | 4/2003 | Iwasa et al. | | |
| 2004/0249045 A1* | 12/2004 | Goodman | ............ | C08K 3/346 |
| | | | | 106/481 |
| 2009/0239175 A1 | 9/2009 | Steinmann | | |
| 2012/0107625 A1* | 5/2012 | Smith | ............... | C09D 7/70 |
| | | | | 427/256 |
| 2013/0331494 A1* | 12/2013 | Lu | ............... | C09D 7/63 |
| | | | | 524/192 |
| 2015/0132510 A1* | 5/2015 | Fukunaga | ............ | B41M 5/44 |
| | | | | 428/32.66 |

OTHER PUBLICATIONS

DSM Composite Resins, Atlac High Performance Resins of Outstanding Quality.*
Cova Scientific "Heat Activated Adhesive Systems", https://www.covascientific.com/blog/heat-activated-adhesive-systems-an-overview, 2 pages (Sep. 29, 2015).
SoftSchools "Calcium carbonate Formula", http://www.softschools.com/formulas/chemistry/calcium_carbonate_uses_properties_structure_uses_properties_structure_formula/297/, 1 page (2015).
R.E. Carrol Inc. "L-207A Microcrystalline Silica", https://www.recarroll.com/product-details.cfm/ProdID/612/category/346, 9 pages (Jun. 1, 2015).

* cited by examiner

STAINABLE LAMINATE PRODUCTS, COMPOSITIONS, AND METHODS OF MANUFACTURE

RELATED APPLICATIONS

The present application is the U.S. National Stage of International Application No. PCT/US2019/017554, filed Feb. 11, 2019, which is related to and claims the benefit of U.S. Provisional Application No. 62/628,618, filed Feb. 9, 2018. The present application is also related to the subject matter of PCT Application No. PCT/US17/46386, filed on Aug. 10, 2017, which claims the benefit of U.S. Provisional Application No. 62/373,287, filed on Aug. 10, 2016 and the benefit of U.S. Provisional Application No. 62/412,256, filed on Oct. 24, 2016. The contents of each of the above applications are incorporated herein by reference thereto in their entireties.

TECHNICAL FIELD

This disclosure relates to stainable laminate wood or wood products, resin binder formulations, and methods of manufacturing stainable laminate wood or wood products. The methods disclosed herein provide a laminate wood or wood product capable of being stained, including with typical wood stains, other stains, or colorants.

BACKGROUND

Laminated engineered wood products are in high demand in the market and used in applications including furniture, cabinetry, flooring, walls, paneling, doors, and shelving. Many engineered wood products are laminated with a thermoset polymer adhered to a composite wood substrate. These laminated engineered wood products can be more economical and long-lasting than traditional wood products, but laminated engineered wood products are not reliably stainable. Consumer demand for high quality products that look like wood has led to laminated porous panel products and other engineered wood products that mimic wood grains and colors, but it is typically evident even without close inspection that the product is not real wood.

Laminated engineered wood products that appear "wood-like" also suffer from an additional drawback—they rely on processes that fix the color of the laminate at the factory. Thus, a consumer or decorator is limited in color choice and forced to buy laminated engineered wood products from a single manufacturer if the products are to match each other in color. Further, a manufacturer must determine how many shades and patterns of different wood-like products to carry and manufacture. This inflexibility at the manufacturer leads to both unsold stock and unmet consumer demand when the colors produced do not accurately predict demand. Even still, the consumer often makes compromises by limiting color choices or unknowingly installing poor color matches.

In contrast, hardwood veneers are able to readily take a wood stain that can be applied on-site. Hardwood veneers, however, are costly and many desirable and exotic hardwood veneers use hardwood materials that may not be sustainable wood products. The cost of engineered wood products is drastically lower than hardwood veneers. These engineered wood products are also much more sustainable as they are byproducts of the woodworking industry globally.

Accordingly, there is a need for Laminate engineered wood products and methods of manufacturing engineered wood products that are capable of being stained with a wood stain, other stain or colorant. There is also a need to provide compositions and methods of providing a professional high-quality look similar to hardwood veneer panels or better. The products and methods disclosed herein would reduce manufacturing and consumer costs and provide far greater flexibility for the consumer to use a number of various wood stains and staining methods currently available for wood and hardwood veneers only.

SUMMARY

The present invention is directed to stainable laminate products, resin binder formulation compositions, and methods of manufacturing stainable laminate products. The different aspects and implementations of the invention may comprise, one or more of the components and steps set forth in the appended claims, which are hereby incorporated by reference. In one aspect of the invention, a stainable laminate product comprises: a substrate; and a resin binder layer affixed to the substrate. The resin binder layer may include one or more resin binder layers. The resin binder layer, whether one or more layers, comprises a top-most resin binder layer comprising a resin binder formulation. The resin binder formulation includes one or more porosity agents. The one or more porosity agents enable staining of the laminate product.

In certain non-limiting embodiments, the resin binder layer comprises a thermosetting acrylic resin formulation, a thermosetting polymer resin formulation, or a formulation comprising both thermosetting acrylic resins and thermosetting polymer resins. For example, in one particular embodiment, the top-most resin binder layer comprises a thermosetting acrylic resin formulation, a thermosetting polymer resin formulation, or a formulation comprising both thermosetting acrylic resins and thermosetting polymer resins.

An example of a suitable thermosetting polymer resin formulation comprises melamine-formaldehyde resins, urea-formaldehyde resins, and combinations thereof. It is preferable that at least the top-most resin binder layer comprises melamine-formaldehyde or a combination thereof. Non-limiting examples of suitable formulations before curing comprise between 15 and 50 weight percent of melamine-formaldehyde resins, for example, between 20 and 40 weight percent of melamine-formaldehyde resins. In certain non-limiting embodiments the top-most resin binder layer includes between 5 and 15 weight percent of urea-formaldehyde resins, before curing. Formulation component examples of percentage weights after curing include, for example, between 10 and 45 weight percent of melamine-formaldehyde resins, after curing; between 15 and 35 weight percent of melamine-formaldehyde resins, after curing. In a particular embodiment, the thermosetting polymer resin formulation has between 5 and 12 weight percent of urea-formaldehyde resins, after curing.

The resin binder formulation, e.g., of the top-most resin layer, preferably includes between 30 and 75 weight percent (e.g., between 30 and 70 weight percent, between 30 and 65 weight percent, between 30 and 60 weight percent, between 35 and 75 weight percent, between 35 and 70 weight percent, between 35 and 60 weight percent, between 35 and 55 weight percent, between 35 and 50 weight percent, between 40 and 70 weight percent, between 40 and 65 weight percent, between 40 and 60 weight percent, between 40 and 55 weight percent, between 40 and 50 weight percent, between 45 and 65 weight percent, between 45 and 60 weight percent, between 50 and 60 weight percent, or between 40 and 46 weight percent) of one or more porosity agents, before curing. For example, the resin binder formulation in certain exemplary embodiments comprise between 35 and 65 weight percent of the porosity agent or combination of porosity agents, before curing.

In another non-limiting example, the resin binder formulation has at least 35 weight percent of one or more porosity agents, (e.g., between 40 and 85 weight percent, between 40 and 80 weight percent, between 45 and 80 weight percent, between 45 and 75 weight percent, between 50 and 75 weight percent, between 50 and 70 weight percent, between 55 and 75 weight percent, between 55 and 70 weight percent, between 55 and 65 weight percent, between 60 and 70 weight percent, or between 58 and 62 weight percent), after curing. In a specific example, the resin binder formulation comprises between 45 and 85, or between 50 and 75 weight percent of the one or more porosity agents, after curing.

Specific exemplary porosity agents include: aluminum oxide, calcium carbonate, calcium oxide, cellulosic particles, corn starch, crystalline silica, feldspar, iron oxides, kaolin clay, mica, Minex®, microcrystalline silica, potassium oxide, silane, silicon dioxide, sodium oxide, talc, titanium dioxide, wax particles, wollastonite, and combinations thereof.

In certain aspects of the invention, the porosity agent(s) is a mineral or combination of minerals ranging in size from 0.01-85 μm or 1-75 μm. The mineral, or combination, typically comprises a first mineral with a typical size of between 1.5 and 5 μm and a second mineral with a typical size of between 10 and 15 μm. In a specific exemplary embodiment, the first mineral is microcrystalline silica and the second mineral is calcium carbonate, e.g., between 15 and 25 weight percent of microcrystalline silica and between 15 and 35 weight percent of calcium carbonate, before curing. In yet another example, the resin binder formulation has between 5 and 15 weight percent of talc, before curing. In addition, non-limiting examples of the density of certain minerals include a density from 0.9 to 3.8 $g/cm^3$, or from 1.0 to 3.5 $g/cm^3$.

The resin binder formulation may include additional ingredients, such as, pigments. For example, the pigment or combination of pigments typically has a volume concentration of between 25% and 85%, e.g., between 30% and 70%, between 40% and 60% of the resin binder formulation volume, before curing.

In yet another embodiment, the invention is directed to a method preparing a stainable laminate product. The method comprises the steps of applying one or more resin binder layers to a substrate and pressing the one or more resin binder layers to the substrate under heat and/or pressure, wherein the one or more resin binder layers typically has a top-most resin binder layer and the top-most resin binder layer comprises a resin binder formulation comprising at least 35 weight percent of one or more porosity agents. In particular embodiments, the one or more porosity agents is in an amount as described above. The one or more porosity agents may be between 25 and 175 grams per square meter (gsm) of the substrate, e.g., 55 and 175 gsm, 85 and 175 gsm of the substrate.

In yet another embodiment, the invention is directed to a resin binder formulation composition, comprising: thermosetting polymer resins, thermosetting acrylic resins, or combination thereof; and one or more porosity agents in an amount of at least 45 weight percent (e.g., between 50-85 weigh percent) of the total resign binder formulation.

BRIEF DESCRIPTION OF THE DRAWINGS

FIGS. 1-13 are not drawn to scale and should not be interpreted as being to scale. For example, the substrate, e.g., porous panel product, may be tens or hundreds of times thicker than the total of all resin binder and backing layers.

DETAILED DESCRIPTION

Figure 1:
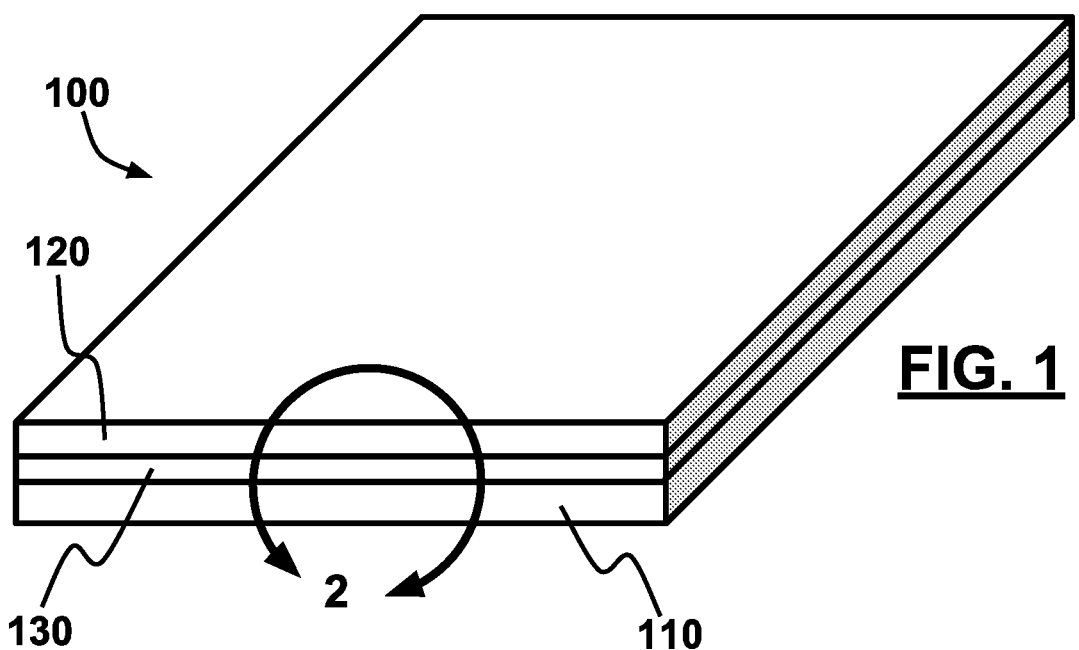
FIGS. 1-2 depict non-limiting examples of a stainable laminate wood or wood product.

The verb "comprise" as is used in this description and in the claims and its conjugations are used in its non-limiting sense to mean that items following the word are included, but items not specifically mentioned are not excluded.

Reference to an element by the indefinite article "a" or "an" does not exclude the possibility that more than one of the elements are present, unless the context clearly requires that there is one and only one of the elements. The indefinite article "a" or "an" thus usually means "at least one." For example, "a" or "the" porosity agent refers to one porosity agent or a combination of porosity agents.

The term "additive" refers generally to compounds that make the product flow, level, dilute, reduce, react, and/or defoam, e.g., a deaerator, a wetting agent, a release agent, and a catalyst, etc. Accordingly, additives include surface modifiers, curing agents, and the like.

The term "finishing coating" or "finishing coat" refers to coating layer(s) visible upon completion and final assembly of the product (e.g., cabinetry, flooring, furniture, millwork, and fixture made from a porous panel substrate). Generally, the finishing coating is applied to the surface of a sealed/primed substrate, and lacquers and varnishes are common examples of finishing coatings.

The term "pigment volume concentration" or "PVC" refers to the volume percentage of solid particles in the system after film formation. The calculation is as follows: the volume of the porosity agent divided by the volume of the porosity agent plus the resin volume solids. "Pigment volume concentration" determines if there is enough mineral in the resin system to actually realize the absorbency of the minerals in the final surface.

The term "porous panel product" refers to engineered wood products that are composite materials manufactured by binding or fixing the strands, particles, fibers, chips, or boards of woods together with some method of fixation. Non-limiting examples of porous panel products include a medium-density fiberboard (MDF), a high-density fiberboard (HDF), a medium-density overlay (MDO), a high-density overlay (HDO), an oriented strand board (OSB), a particle board, a chip board, a vermiculite, a fiber-reinforced plastic (FRP), a panel product, and a plywood, etc. One of ordinary skill in the art will recognize that the materials used to construct a porous panel product may change over time as availability of resources change, and porous panel products may be constructed at least partially of other plant materials (e.g., palm trees or plants, plant or tree leaves, palm fronds, coconuts, coconut husks, natural rubber, grasses, bamboo, fibrous plant material, etc.) and non-plant materials (e.g., plastics, synthetic rubber, recycled materials, etc.), and the term "porous panel product" may include one or more of these materials or other materials yet to be developed or yet to come into use. In preferred embodiments, the term "a porous panel product" refers to a particle board, a chip board, an oriented strand board (OSB), a medium-density fiberboard (MDF), a high-density fiberboard (HDF), a medium-density overlay (MDO), or a high-density overlay (HDO).

The term "resin binder" or "resin" refers generally to synthetic materials that are viscous liquids capable of hardening permanently. Non-limiting examples of resin binders or resins include polymers, melamines, thermosetting plastics, phenolics, oligomers, alkyds, acrylics, acrylates, epoxies, urethanes, urea formaldehydes, polyesters, polycarbonates, etc., and combinations thereof.

The term "thermosetting polymer resin" refers to a polymer that is irreversibly hardened by curing from a soft solid or viscous liquid prepolymer or resin. Non-limiting examples of thermosetting polymer resins include polymers, melamines, thermosetting plastics, phenolics, oligomers, epoxies, urethanes, urea formaldehydes, polyesters, polycarbonates, etc., and combinations thereof.

The term "melamine" refers to the organic compound with the formula: $C_3H_6N_6$ or $C_3N_3(NH_2)_3$, IUPAC Name: 1,3,5-triazine-2,4,6-triamine. The term "melamine resin" or "melamine formaldehyde" refers a hard, thermosetting plastic material made from melamine and formaldehyde by polymerization.

The term "urea" refers to the organic compound with the formula $CO(NH_2)_2$. The term "urea-formaldehyde resin" refers to a non-transparent thermosetting resin or polymer produced from urea and formaldehyde.

The term "wood stain" or "stain" refers to a colorant (e.g., one or more dyes and/or pigments) suspended or dissolved in an agent or solvent, including without limitation, an oil stain, a varnish stain, a water-based stain, a solvent-based stains, a gel stain, a lacquer stain, a water-soluble dye stain, an ultra-violet (UV) light cured colorant (resins, sealants, stains, etc.), a metal-complex (metalized) dye stain, or similar stains or colorants now existing or yet to be discovered that may be used to stain laminate wood, wood, porous panel products, or other porous organic and inorganic materials.

The term "stainable" refers to an ability of the surface of a material to have absorption characteristics that allow a pigment or dye to penetrate which creates a "stain" effect.

The present disclosure relates to the discovery that certain porosity-promoting surface agents included in a formulation of a resin binder (e.g., a thermosetting polymer resin such as a melamine resin) impregnated in a paper or fiber layer result in the resin binder treated layer having a porous surface that is capable of being stained with a wood stain or other colorant, which allows a laminate wood or wood product to be stained with a variety of wood stains after being manufactured.

Figure 2:
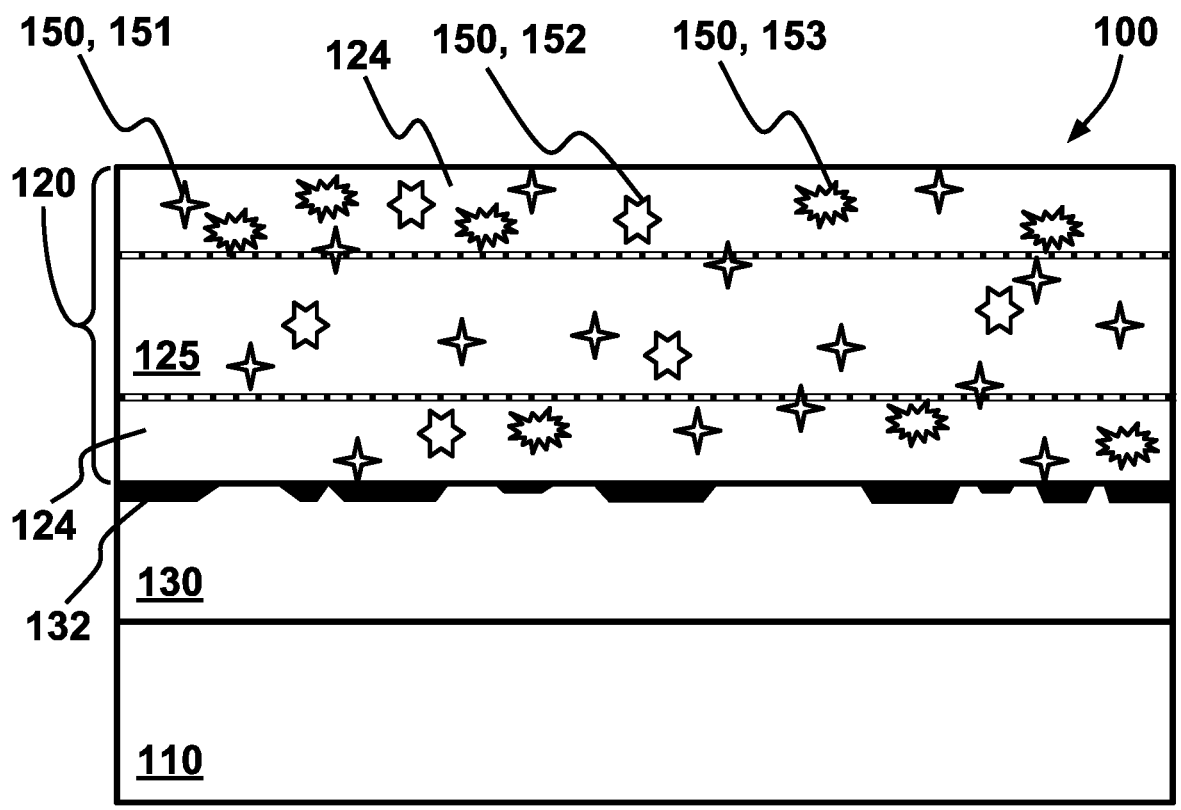

FIGS. 1-2 depict various implementations of a stainable laminate product 100. A stainable laminate product 100 is formed by adding at least one porosity agent 150 to a resin binder layer 120 before pressing and curing the resin binder layer 120. Existing formulations of thermosetting polymer resins may be used in the present disclosure to create stainable resin binder layers 120 by adding porosity agents 150 as disclosed herein. For example, melamine-formaldehyde resin is commercially available from manufacturers such as: Dynea International Oy, Georgia-Pacific Chemicals, LLC, or Hexion Specialty Chemicals, Inc., etc. Additionally, the thermosetting polymer resin 124 may also contain one or more additives such as plasticizers, surfactants, defoaming agents, thickening agents, leveling agents, latent catalysts, or wetting agents, etc. In processing, the resin binder may be diluted (e.g., with a solvent or water) in a resin binder bath for saturating a layer such as the paper layer (sheet 125).

In FIG. 2, the stainable resin binder layer 120 includes porosity agents 150 and thermosetting polymer resin 124 impregnated in any one of a variety of different sheets 125 of paper or fiber including, for example: decorative paper, kraft paper, overlay paper, cellulose paper, foil, nylon, rayon, wood pulp, wood veneer, linen, fabric, or other papers or fibers for use in laminates or with the thermosetting polymer resin 124. The sheet 125 allows the thermosetting polymer resin 124 to soak through and also provides a structure for the thermosetting polymer resin 124 to cling to the top and bottom surfaces. In numerous embodiments, the sheet 125 in the top-most resin binder layer 120 is a translucent paper (e.g., overlay paper or cellulose paper) or fiber, which allows the resulting translucent top-most resin binder layer 120 to cover and protect a decorative paper layer 130 containing any one of various different colors or patterns 132 (e.g., a printed decoration or pattern). In alternative embodiments, the sheet 125 in the top-most resin binder layer 120 is a decorative paper with no overlay paper, cellulose paper, or translucent papers or fibers placed over the decorative paper. A conventional resin binder layer (i.e., not the stainable resin binder layer 120) used as the top-most layer typically utilizes overlay paper in heavy duty use cases (because this provides additional scratch and wear protection above a decorative paper), and may utilize only the decorative paper (with no overlay paper) in light duty use cases.

In some embodiments, the stainable laminate product 100 includes a stainable resin binder layer 120, and the stainable resin binder layer 120 is formed by saturating a sheet 125 with a thermosetting polymer resin 124 that contains at least one porosity agent 150. Porosity agents 150 that have been found to perform well are generally inert minerals that do not become fully saturated with the thermosetting polymer resin 124 or otherwise provide routes and pathways for a wood stain to seep through the porosity agents 150 down to ultimately stain the sheet 125. In numerous cases, the porosity agents 150 also do not substantially alter the curing times of the sheet 125 saturated with the thermosetting polymer resin 124.

The porosity agents 150 can contribute to creating a stainable laminate product 100 in a number of different ways. The porosity agents 150 distributed throughout the resin binder layer 120 provide a path for a stain to seep into and ultimately reach the sheet 125, where the sheet 125 then soaks in, distributes, and holds the stain. Additionally, the porosity agents 150 themselves can soak in stain and help add more of the stain color throughout the resin binder layer 120. Experiments have shown that deep and even stain penetration often occurs when the pigment volume concentration of the porosity agent(s) 150 to the thermosetting polymer resin 124 reaches or exceeds the critical pigment volume concentration of the thermosetting polymer resin 124. The critical pigment volume concentration of the thermosetting polymer resin 124 often depends on the physical and chemical characteristics of the porosity agents 150 and how these characteristics interact with the thermosetting polymer resin 124. Thus, it is understood that the critical pigment volume concentration of the thermosetting polymer resin 124 will vary across different porosity agents 150. By way of example, if the sheet 125 in FIG. 2 is substantially translucent (e.g., overlay paper or cellulose paper), then allowing a non-opaque stain to seep into and color the sheet 125 will result in the decorative paper layer 130 showing through the stained resin binder layer 120. Stains that absorb well into the resin binder layer 120 will result in less amount of stain removing or being scratched off in tests such as a cross hatch adhesion tape test (e.g., following ASTM D 3359) or a nickel scratch test (applying a nickel at a 45° angle with 2 pounds of surface weight).

Non-limiting examples of the porosity agents 150 include: aluminum oxide (if contained within a filler mixture such as Minex® fillers including Nepheline Syenite); calcium carbonate (e.g., precipitated calcium carbonate); calcium oxide; cellulosic particles; corn starch; crystalline silica (e.g., microcrystalline silica, untreated silica, treated silica, and silicate minerals); feldspar; iron oxides; kaolin clay; mica; Minex® (from Unimin Corp. of New Canaan, CT); potassium oxide; silane; silicon dioxide; sodium oxide; talc; titanium dioxide; wax particles; wollastonite; another mineral commonly used in the production of paint and coatings; another agent that result in a cured resin binder surface having porous characteristics that enable a stain to penetrate into the resin binder layer 120, or combinations thereof, etc. In some implementations, at least one of the porosity agent 150 is selected from the group consisting of: calcium carbonate, crystalline silica, feldspar, kaolin clay, Minex®, silica (treated and untreated), and talc. In other implementations, at least one of the porosity agent 150 is selected from the group consisting of: calcium carbonate, crystalline silica, talc, and feldspar. In yet other implementations, the porosity agent 150 comprises calcium carbonate, crystalline silica, and talc. In further implementations, the porosity agent 150 comprises calcium carbonate and crystalline silica. In yet further implementations, the porosity agent 150 comprises crystalline silica and talc.

In non-limiting embodiments, the particle size of the porosity agent 150 typically ranges from 0.01 μm to 110 μm, or any other number range in between, e.g., 0.01-100 μm, 0.01 μm to 85 μm, 0.01-80 μm, 0.01-50 μm, 0.01-40 μm, 0.1-90 μm, 0.1-80 μm, 0.5-85 μm, 0.5-75 μm, 1-85 μm, 1-75 μm, 1-45 μm, 1-35 μm, 1.5-5 μm, 1.5-4.6 μm, 1.5-4.2 μm, 1.6-4.2 μm, 1.6-3.8 μm, 1.7-3.8 μm, 1.7-3.4 μm, 1.8-3.4 μm, 1.8-3 μm, 1.9-3 μm, 1.9-2.6 μm, 2-2.6 μm, 2-2.2 μm, 10-70 μm, 10-60 μm, 10-15 μm, 10-14 μm, 10.1-13.5 μm, 10.2-13 μm, 10.3-13 μm, 10.3-12.5 μm, 10.4-12.5 μm, 10.4-12 μm, 10.5-12 μm, 10.5-11.5 μm, 15-50 μm, 20-65 μm, 20-60 μm, 25-65 μm, 25-60 μm, 30-60 μm, 30-55 μm, 35-55 μm, 35-50 μm, 40-50 μm, or 40-45 μm.

In non-limiting embodiments, the density of the porosity agents 150 typically ranges from 0.5 g/cm$^3$ to 4.5 g/cm$^3$, or any other number range in between, e.g., 0.5-4 g/cm$^3$, 0.8-4.1 g/cm$^3$, 0.8-3.5 g/cm$^3$, 0.9-4 g/cm$^3$, 0.9-3.8 g/cm$^3$, 0.9-3.7 g/cm$^3$, 1.0-3.5 g/cm$^3$, 1.1-3.7 g/cm$^3$, 1.1-3.4 g/cm$^3$, 1.2-3.2 g/cm$^3$, 1.4-3.4 g/cm$^3$, 1.4-3.1 g/cm$^3$, 1.5-3.5 g/cm$^3$, 1.5-3 g/cm$^3$, 1.7-3.1 g/cm$^3$, 1.7-2.8 g/cm$^3$, 2-3 g/cm$^3$, 2-2.8 g/cm$^3$, or 2-2.5 g/cm$^3$.

In some implementations, the porosity agent 150 is selected based on a high absorbency. For example, microcrystalline silica has a high absorbency and is relatively fine (typically ranges from 1.5 μm to 5 μm or any number range in between, e.g., 1.5-4.6 μm, 1.5-4.2 μm, 1.6-4.2 μm, 1.6-3.8 μm, 1.7-3.8 μm, 1.7-3.4 μm, 1.8-3.4 μm, 1.8-3 μm, 1.9-3 μm, 1.9-2.6 μm, 2-2.6 μm, or 2-2.2 μm). Also, certain types of talc have a chemical structure that is flat and platy and that structure also creates high absorbency due to its high surface area per weight. In some implementations, the porosity agent 150 is selected based on high loading which leads to cost-saving. For example, certain types of calcium carbonate have a medium range of absorbency, but is a smaller particle allowing for high loading (typically ranges from 10 μm to 15 μm, or any number range in between, e.g., 10-14 μm, 10.1-13.5 μm, 10.2-13 μm, 10.3-13 μm, 10.3-12.5 μm, 10.4-12.5 μm, 10.4-12 μm, 10.5-12 μm, or 10.5-11.5 μm). Calcium carbonate increases the pH of the formulation, which could create an issue with the acid catalyst that forms the film of the melamine resin. To address this issue, in some implementations where calcium carbonate is used (alone or together with a second porosity agent such as microcrystalline silica), the catalyst amount is increased by 5-15% by weight. In other implementations, calcium carbonate is replaced, either completely or partially, by a grade of talc to address the issue.

In non-limiting embodiments, the typical amount of the one or more porosity agents 150 is between 25-175 grams per square meter (gsm) of the substrate, or any number range in between, for example, 25-105 gsm, 35-175 gsm, 35-170 gsm, 35-160 gsm, 45-170 gsm, 45-165 gsm, 45-155 gsm, 55-175 gsm, 55-165 gsm, 55-160 gsm, 55-145 gsm, 60-175 gsm, 60-145 gsm, 70-175 gsm, 70-130 gsm, 80-175 gsm, 80-125 gsm, 80-115 gsm, 85-175 gsm, 85-170 gsm, 85-115 gsm, 85-110 gsm, 90-175 gsm, 90-170 gsm, 90-165 gsm, 90-110 gsm, 90-105 gsm, 100-175 gsm, 100-165 gsm, or 100-160 gsm, or 95-105 gsm. In some implementations, the amount of the porosity agent typically ranging in size from 10-15 μm (e.g., calcium carbonate) is between 20-110 gsm of the substrate, or any number range in between, for example, 30-110 gsm, 30-100 gsm, 40-100 gsm, 40-90 gsm, 50-90 gsm, 50-80 gsm, 40-110 gsm, 50-110 gsm, or 60-110 gsm. In other implementations, the amount of the porosity agent typically ranging in size from 1.5-5 μm (e.g., microcrystalline silica) is between 10-80 gsm of the substrate, or any number range in between, for example, 20-75 gsm, 20-70 gsm, 30-70 gsm, 30-65 gsm, 40-65 gsm, 40-80 gsm, 45-80 gsm, 50-80 gsm, or 50-75 gsm.

Some experiments resulted in a wood stain not taking hold in a stainable resin binder layer 120 until the amount of the porosity agent 150 reached nearly 50% of the formulation weight of the thermosetting polymer resin 124. In spite of the significant amount of porosity agents present in the thermosetting polymer resin 124, these experiments resulted in a stainable resin binder layer 120 that adhered well to the underlying substrate 110. In some embodiments, the typical amount of porosity agents 150 added to the thermosetting polymer resin 124 formulation is between 40% and 60% of the total weight, or preferably 45%±5% of the formulation weight of the thermosetting polymer resin 124.

In non-limiting embodiments, the amount of the porosity agent 150 added to the resin binder formulation 324 (with the thermosetting polymer resin 124 or the thermosetting acrylic resin) is between 15% and 80% of the total formulation weight of the saturation resin 324 (e.g., 124), or any percent range in between, e.g., 20-80%, 20-70%, 20-65%, 25-80%, 25-70%, 25-65%, 25-60%, 30-80%, 30-70%, 30-60%, 30-55%, 35-80%, 35-75%, 35-70%, 35-55%, 35-50%, 40-80%, 40-75%, 40-70%, 40-50%, 40-45%, 45-80%, 45-70%, 45-65%, 50-80%, 50-70%, 50-65%, 50-60%, 55-80%, or 55-60%. In some embodiments, one or more of silane, organosilane, or polyvinyl butyral are added to the saturation resin 324 (e.g., 124) to reduce the amount of porosity agents 150 required by, typically, 1-30%, e.g., at least 1%, 5%, 10%, 15%, 20%, etc.

In other embodiments, before curing, the porosity agent 150 comprises between 30-75% of the weight of the resin binder formulation 324 (e.g., 124), or any percent range in between, for example, 30-70%, 30-65%, 30-60%, 35-75%, 35-70%, 35-65%, 35-60%, 35-55%, 35-50%, 40-70%, 40-65%, 40-60%, 40-55%, 40-50%, 45-65%, 45-60%, 50-60%, or 40%-46%.

In some implementations, before curing, the porosity agent 150 comprises at least 30%, for example, at least 35%, at least 40%, at least 45%, at least 50%, at least 55%, at least 60%, at least 65%, or at least 70% of the weight of the resin binder formulation 324 (e.g., 124).

In further embodiments, after curing, the porosity agent 150 comprises between 40-85% of the weight of the resin binder formulation 324 (e.g., 124), or any percent range in between, for example, 40-80%, 45-80%, 45-75%, 50-75%, 50-70%, 55-75%, 55-70%, 55-65%, 60-70%, or 58-62%. In some implementations, after curing, the porosity agent 150 comprises at least 40%, for example, at least 45%, at least 50%, at least 55%, at least 60%, at least 65%, at least 70%, at least 75%, or at least 80% of the weight of the resin binder formulation. The pigment volume concentration (PVC) is very important in the overall functionality of the system to become absorbent. In non-limiting embodiments, the pigment volume concentration (PVC) is between 25%-80%, or any percent range in between, for example, 25%-75%, 25%-70%, 25%-65%, 25%-60%, 25%-55%, 30%-80%, 30%-75%, 30%-70%, 30%-65%, 30%-60%, 30%-55%, 35%-80%, 35%-75%, 35%-70%, 35%-65%, 35%-60%, 35%-55%, 40%-80%, 40%-75%, 40%-70%, 40%-65%, or 40%-60%, etc.

FIG. 2 illustrates a non-limiting example of a resin binder layer 120 including three different types of porosity agents 150, which are identified as a first porosity agent type 151, a second porosity agent type 152, and a third porosity agent type 153. In the non-limiting example of FIG. 2, the material used for the sheet 125 has a sufficiently porous structure that both porosity agent types 151 and 152 saturate and penetrate into sheet 125, but the third porosity agent type 153 is too large or otherwise unable to penetrate into the sheet 125. Thus, the third porosity agent type 153 depicted in FIG. 2 is dispersed throughout the stainable resin binder layer 120 above and below the sheet 125, but not within the sheet 125. In some embodiments, the porosity agents 150 are not present within or do not substantially penetrate into the sheet 125.

In some embodiments, the porosity agent 150 comprises multiple porosity agents, e.g., a first porosity agent type 151, a second porosity agent type 152, and a third porosity agent type 153. Different types of porosity agents 150 may be used together, e.g., silica, talc, and Kaolin clay within the same formulation. Different varieties within the same type of porosity agents 150 may be used together, e.g., two or more different varieties of kaolin clay within the same formulation. Different sizes of one or more types of porosity agents 150 may be used together, e.g., talc of 5-10 μm used with talc of 35-45 μm; mica of 10-20 μm used with talc of 30-40 μm; or other combinations of sizes. Different densities of one or more types of porosity agents 150 may be used together, e.g., cellulosic particles of about 1.1 g/cm³ used with cellulosic particles of about 1.6 g/cm³; cellulosic particles of about 1.5 g/cm³ used with talc of about 2.8 g/cm³; or other combinations of densities. Accordingly, a single formulation of resin binder 324 (melamine resin 124 and/or thermosetting acrylic resin) may contain different types or varieties of the same type (with different sizes or densities) of porosity agents 150 within the resin binder formulation.

In some embodiments, the first porosity agent is calcium carbonate, the second porosity agent is microcrystalline silica, and the weight ratio between calcium carbonate and microcrystalline silica is 3:1-0.3:1 or any ratio range in between, for example, 3:1-1:3, 3:1-1:2.5, 3:1-1:2, 3:1-1:1.5, 3:1-1:1, 3:1-2:1, 2.5:1-1:3, 2.5:1-1:2.5, 2.5:1-1:2, 2.5:1-1:1.5, 2.5:1-1:1, 2.5:1-2:1, 2:1-1:3, 2:1-1:2.5, 2:1-1:2, 2:1-1:1.5, 2:1-1:1, 1.5:1-1:3, 1.5:1-1:2.5, 1.5:1-1:2, or 1.5:1-1:1. In some implementations, the weight ratio between calcium carbonate and microcrystalline silica is about 4:1, about 3:1, about 2:1, about 1.9:1, about 1.8:1, about 1.7:1, about 1.6:1, about 1.5:1, about 1.4:1, about 1.3:1, about 1.2:1, about 1:1, about 1:1.5, or about 1:2. In other implementations, before curing, calcium carbonate comprises between 20-35% of the weight of the resin binder formulation, for example, 20-32%, 22-30%, 22-28%, 25-28%, or 22-25%. In further implementations, before curing, microcrystalline silica comprises between 15-25% of the weight of the resin binder formulation, for example, 15-22%, 18-22%, 19-22%, or 19-21%. In specific non-limiting implementations, before curing, calcium carbonate and microcrystalline silica comprise about 30% (e.g., between 28-32% or between 29-31%) and about 20% (e.g., between 18-22% or between 19-21%) of the weight of the resin binder formulation, respectively.

In some embodiments, the first porosity agent is calcium carbonate, the second porosity agent is microcrystalline silica, and the third porosity agent is talc. In some implementations, before curing, calcium carbonate comprises between 15-25% of the weight of the resin binder formulation, for example, 15-22%, 18-22%, 19-22%, or 19-21%. In other implementations, before curing, microcrystalline silica comprises between 15-25% of the weight of the resin binder formulation, for example, 15-22%, 18-22%, 19-22%, or 19-21%. In further implementations, before curing, talc comprises between 5-15% of the weight of the resin binder formulation, for example, 5-12%, 8-12%, 9-12%, or 9-11%. In a specific non-limiting implementation, calcium carbonate comprises about 20% (e.g., between 18-22% or between 19-21%) of the weight of the resin binder formulation; microcrystalline silica, comprising about 20% (e.g., between 18-22% or between 19-21%) of the weight of the resin binder formulation; and talc comprises about 10% (e.g., between 8-12% or between 9-11%) of the weight of the resin binder formulation.

The thermosetting polymer resin 124 comprising porosity agents 150 to make the stainable resin binder layer 120 may be any one of various different commercially available thermosetting polymer resins. One example of a formulation for a thermosetting polymer resin 124 includes (by weight): 89% melamine formaldehyde resin, 7.62% water, 1.6% additives (not the porosity agents 150), 0.53% wetting agent, 0.5% catalyst; and 0.75% plasticizer. Another example of a formulation for a thermosetting polymer resin 124 includes (by weight): 33.25% melamine formaldehyde resin, 0.11% wetting agent, 0.11% release agent, 17.3% water, 0.13% catalyst, 29.5% calcium carbonate, and 19.6% silica. Another example of a formulation for a thermosetting polymer resin 124 includes: 60% solids aqueous solution of melamine formaldehyde resin; adding water to dilute the melamine formaldehyde resin down to 52% solids aqueous solution; and then adding a small amount of release agent and a catalyst (e.g., 0.4% by total weight of a release agent and 0.3% by total weight of a catalyst).

The thermosetting polymer resin 124 to which the porosity agents 150 are incorporated or added can be any commercially viable thermosetting polymer resins, including, for example, any of a variety of known melamine formaldehyde resins, urea formaldehyde resins, or melamine urea formaldehyde resins that are presently commercially available or in use. Non-limiting examples of melamine formulations are described in greater detail, and hereby incorporated by reference in their entirety, in the following patents and references: U.S. Pat. Nos. 5,702,806; 4,250,282; 4,109,043; 4,044,185; 4,713,299; 2,260,239, 3,496,131; EP Patent No. 0711792; H. Deim, et al. "*Amino Resins*" in Ullmann's Encyclopedia of Industrial Chemistry, 2012, Wiley-VCH, Weinheim. Urea formaldehyde resins (e.g., used to pre-wet a sheet 125) and other supplementary or alternative thermosetting resins include commercially available resins and are also described in several of these patent references. Non-limiting examples of urea formulations are described in greater detail, and hereby incorporated by reference in their entirety, in the following patents and references: U.S. Pat. Nos. 3,769,143 and 2,187,383.

Although many laminate products currently use a melamine-impregnated top-most layer (e.g., overlay paper(s) or decorative paper), the ability to make the top-most layer of a laminate product stainable by adding porosity agents 150 as disclosed is not limited to only layers impregnated with a melamine resin. The disclosed porosity agents 150 may also be introduced in another thermosetting resin (whether used with or without a melamine resin) to create a layer that is capable of being stained with a wood stain or other stain when the resulting layer is partially or fully cured. For example, thermosetting resins including polyurethane resins, polyester resins, or acrylic resins can also be used instead of a melamine resin. Polyester resins work well in TFL processes, but melamine resins are more common in TFL processes because polyester resins are costlier. This disclosure will generally refer to the disclosed process with respect to a melamine-impregnated layer or a melamine urea mixture-impregnated layer, but the same process and disclosure will also work with at least one or more alternative thermosetting resins (unless expressly identified otherwise).

The resin binder is selected from the group consisting of: polymers, melamines, thermosetting plastics, phenolics, oligomers, alkyds, acrylics, acrylates, epoxies, urethanes, urea formaldehydes, polyesters, and polycarbonates. In some embodiments, the resin binder is selected from the group consisting of: melamine formaldehyde resin, urea formaldehyde resin, polyurethane resins, polyester resins, acrylic resins, thermosetting acrylic resin, and mixtures thereof. In further embodiments, the resin binder is selected from the group consisting of: melamine formaldehyde resin, urea formaldehyde resin, and mixtures thereof.

Porosity agents 150 generally increase the overall mass of the resin binder layer 120. For example, conventional processing may result in 70-100 grams per square meter being added or picked up by the paper. That is, conventional melamine processing often has a "pick up weight" of between 70 and 100 gsm. In contrast, the disclosed resin binder (e.g., thermosetting polymer resin 124) including porosity agents 150 has pick up weights typically ranging from 100 to 240 gsm.

In non-limiting embodiments, the pick-up weight of the resin binder layer 120 (e.g., comprising melamine-formaldehyde resins or both melamine-formaldehyde and urea-formaldehyde resins) is between 100 and 240 gsm, or any number range in between, e.g., 100-230 gsm, 100-220 gsm, 110-240 gsm, 110-230 gsm, 110-220 gsm, 110-210 gsm, 110-180 gsm, 120-240 gsm, 120-230 gsm, 120-220 gsm, 120-215 gsm, 120-210 gsm, 120-200 gsm, 120-190 gsm, 130-240 gsm, 130-230 gsm, 130-220 gsm, 130-215 gsm, 130-210 gsm, 130-200 gsm, 130-190 gsm, 130-185 gsm, 135-180 gsm, 140-240 gsm, 140-230 gsm, 140-220 gsm, 140-210 gsm, 140-200 gsm, 140-195 gsm, 145-190 gsm, 140-180 gsm, 140-175 gsm, 140-160 gsm, 150-240 gsm, 150-230 gsm, 150-220 gsm, 150-210 gsm, 150-205 gsm, 150-190 gsm, 150-185 gsm, 150-170 gsm, 150-160 gsm, 155-200 gsm, 155-170 gsm, 160-240 gsm, 160-230 gsm, 160-220 gsm, 160-200 gsm, 160-195 gsm, 160-180 gsm, 165-180 gsm, 165-175 gsm, 170-240 gsm, 170-190 gsm, 175-190 gsm, or 175-185 gsm. In some embodiments, the pick-up weight of the resin binder layer 120 is at least 110 grams per square meter (e.g., at least 110, 120, 125, 130, 140, 150, or 170 gsm).

In some embodiments, before curing, the amount of melamine formaldehyde resin added to the resin binder formulation is between 15% and 50% of the total formulation weight of the saturation resin 124, or any percent range in between, e.g., 15-45%, 20-50%, 20-45%, 20-40%, 25-50%, 25-45%, 25-40%, 25-35%, 30-50%, 30-45%, 30-40%, or 20%-35%, etc.

In other embodiments, the resin binder comprises melamine formaldehyde resin and urea formaldehyde resin. In some implementations, before curing, the amount of urea formaldehyde resin added to the resin binder formulation is between 2% and 20% of the total formulation weight of the saturation resin 124, or any percent range in between, e.g., 2-18%, 2.5-20%, 2.5-18%, 2.5-16%, 5-18%, 5-16%, 5%-15%, 5-14%, 6-14%, 7-13%, 7.5-16%, 7.5-14%, 7.5-12%, 8-12%, 9-11%, or 10-14%, etc.

In some implementations, the resin binder formulation comprises both melamine formaldehyde resin and urea formaldehyde resin. In non-limiting implementations, before curing, a typical ratio (by weight) between melamine-formaldehyde resin (e.g., 55%) and urea-formaldehyde resin (e.g., 60%) is between 90% (i.e., about 9 melamine-formaldehyde resin:1 urea-formaldehyde resin) to 10% (i.e., about 1 melamine-formaldehyde resin:9 urea-formaldehyde resin), or any percent range in between, for example, 80%, 70%, 65%, 60%, 55%, 50%, 45%, 30%, or 20%. In some implementations, before curing, the weight ratio between melamine-formaldehyde resin (e.g., 55%) and urea-formaldehyde resin (e.g., 60%) is between 4:1 and 1:1, for example, between 4:1 and 1.5:1, between 4:1 and 2:1, between 4:1 and 3:1, between 3.5:1 and 1:1, between 3.5:1 and 1.5:1, between 3.5:1 and 2:1, between 3:1 and 1:1, between 3:1 and 1.5:1, between 3:1 and 2:1, between 2.5:1 and 1:1, between 2.5:1 and 1.5:1, between 2.5:1 and 2:1, or between 2:1 and 1.5:1, or between 2:1 and 1:1.

In some embodiments, the resin binder further comprises an additive, wherein at least one additive is selected from the group consisting of: a wetting agent, a release agents, and a catalyst. In some implementations, before curing, the volume percentage of the additive is between 0-5% of the volume of the resin binder formulation, or any percent range in between, for example, 0.1-4.5%, 0.2-4%, 0.3-3.5%, 0.3-2.8% 0.5-3%, 0.5-2.8%, 0.5-2.6%, 0.6-3%, 0.6-2.5%, 0.7-2.6%, 0.7-2.5%, 0.7-2.4%, 0.7-2%, 0.8-2%, 0.8-1.5%, 0.9-2.4%, 0.9-2.2%, 0.9-1.5%, 0.9-1.1%, 1.1-2.2%, 1.1-2%, 1.3-2%, or 1.3-1.8%. In other implementations, before curing, the volume percentage of the additive is up to 10%, for example, up to 9%, up to 8%, up to 7%, up to 6%, up to 5%, up to 4%, up to 3%, up to 2.5%, up to 2%, up to 1.5%, up to 1%, or up to 0.5% of the volume of the resin binder formulation. In further implementations, before curing, the volume percentage of the additive is at least 0.5% of the volume of the resin binder formulation, for example, at least 0.6%, at least 0.7%, at least 0.8%, at least 0.9%, at least 1.0%, at least 1.1%, or at least 1.2% of the volume of the resin binder formulation.

In some implementations, addition of calcium carbonate to the resin binder requires that the amount of an acid catalyst be increased by 5-15%, by weight. Calcium carbonate increases the pH of the formulation, thus reduces the activity of the acid catalyst. Without the additional catalyst, the press cycle time has to be increased from, for example, 14-18 seconds to 45 seconds. Without the compensation, the longer pressing time would give melamine more time to flow to the surface and reduce the overall absorbency of the panel.

A stainable laminate product 100 may also include a substrate 110. Melamine presses may be used to press at least one stainable resin binder layer 120 (and optionally a decorative paper layer 130) onto the substrate 110, such as: kraft paper, backing layer(s), foil, porous panel product, wood, engineered wood, flooring, fabric, linen, fibrous sheets, cellulose, or other surfaces where melamine laminate layers are used. A substrate 110 may operate to provide structural strength to stainable resin binder layer(s) 120 (and the optional decorative paper layer 130) above the substrate 110.

In some embodiments, the substrate 110 comprises a porous panel product selected from the group consisting of: a particle board, a chip board, an oriented strand board (OSB), a medium-density fiberboard (MDF), a high-density fiberboard (HDF), a medium-density overlay (MDO), and a high-density overlay (HDO).

A stainable laminate product 100 containing a stainable resin binder layer 120 that includes porosity agents 150 may be formed using a number of different laminate pressing methods and processes including, but not limited to: liquid continuous press, high pressure laminate ("HPL") pressing, low pressure laminate pressing, thermally fused laminate pressing ("TFL") (e.g., thermally fused melamine), direct laminate pressing, continuous laminate pressing, flexible continuous laminate pressing, or compact laminate pressing. In some embodiments, the stainable laminate product 100 is created using either an HPL process or a TFL process. Generally speaking, a TFL process uses higher temperatures and lower pressure than an HPL process. In addition, the TFL process typically omits underlying kraft paper and bonds the resin binder layer 120 (where sheet 125 is a decorative paper) directly onto the substrate 110.

Figure 3:
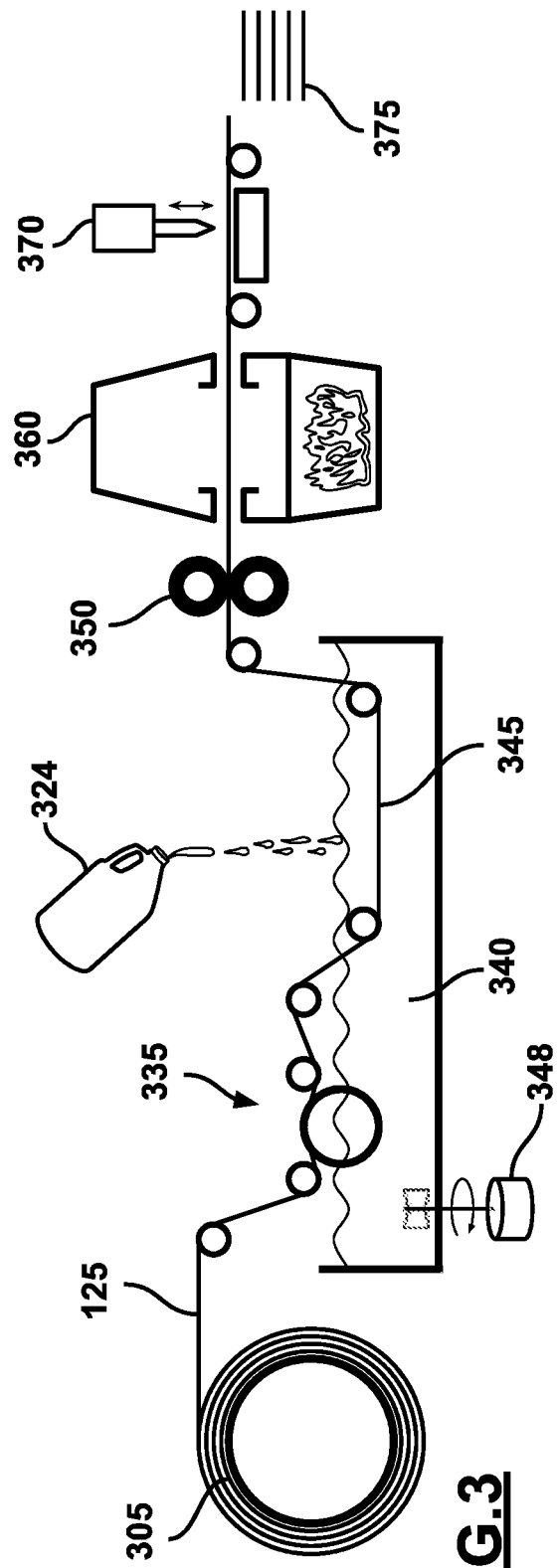
FIGS. 3-5 depict various non-limiting examples of processing stainable laminate wood or wood products.
Figure 4:
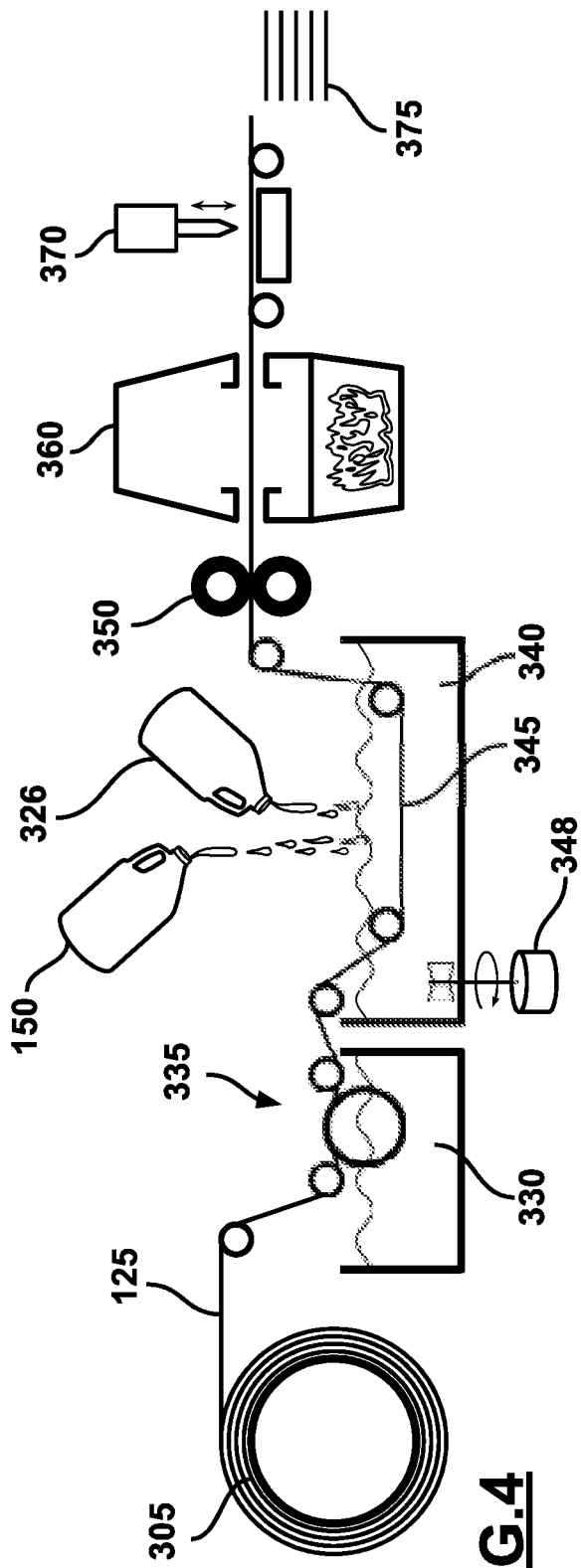
Figure 5:
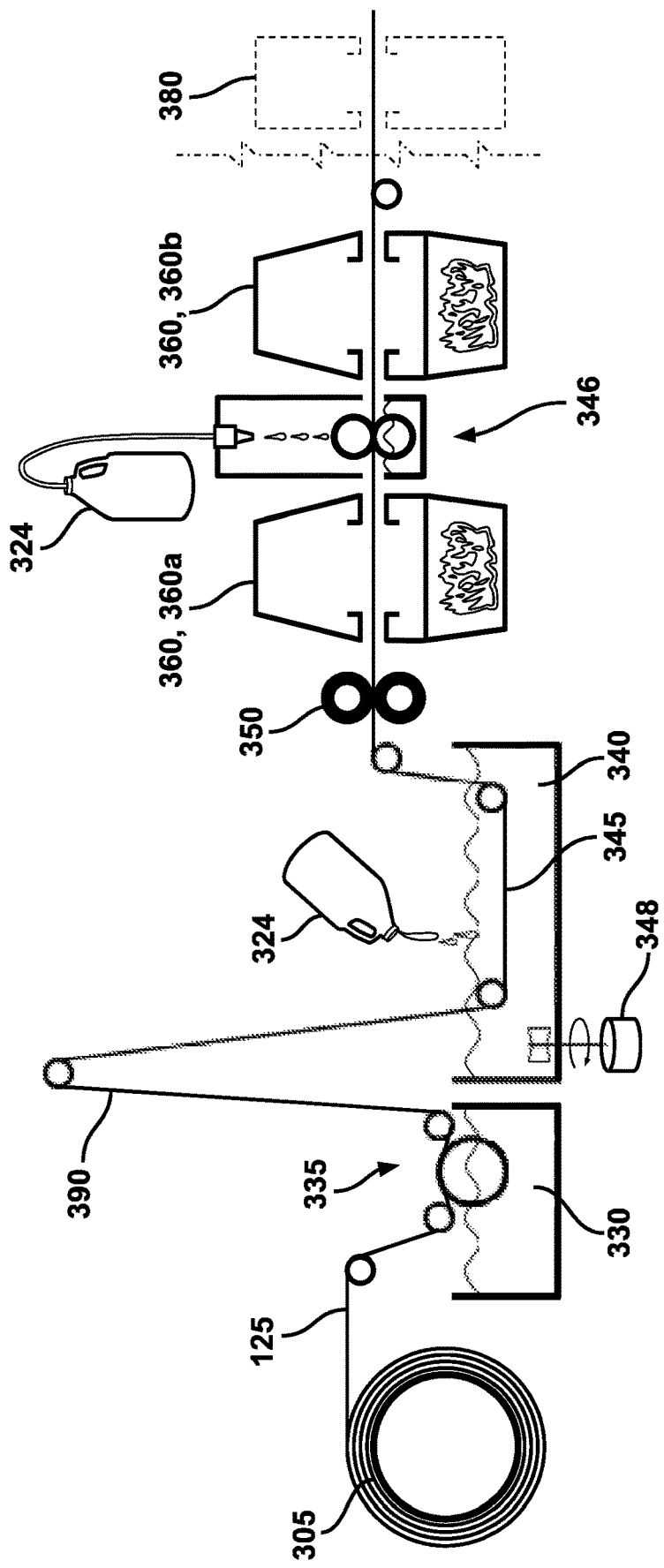

FIGS. 3-5 depict various different processing options for impregnating and saturating the porosity agent 150 and a resin into a sheet 125. Because either a thermosetting polymer resin 124 or a thermosetting acrylic resin may be used, resin 324 will refer to both resins in the explanation of FIGS. 3-5. Impregnating the sheet 125 with the resin 324 includes saturating the sheet 125 (e.g., a paper) in a resin saturation bath 340 of the resin 324. The sheet 125 (e.g., decorative paper, overlay paper, other paper, fabric, etc.) may be stored on a reel 305 that feeds the sheet 125 into the resin saturation bath 340 and through the curing oven(s) 360. A pre-wetting station 335 may be used to partially or lightly wet the sheet 125 with the resin 324 before completely saturating the sheet 125 in the resin saturation bath 340. The pre-wetting station 335 may be located in a separate pre-wetting bath 330 rather than in the main resin saturation bath 340 (compare FIG. 3 to FIGS. 4 and 5). In some embodiments, the pre-wetting bath 330 includes urea formaldehyde while the resin saturation bath 340 includes, for example, a melamine resin, a mixture of melamine resin and urea formaldehyde resin, or another suitable laminate resin. The pre-wet sheet 125 may be dried (but not cured), for example, using a sky roll 390 or other drying mechanism (see FIG. 5). After leaving the saturation step 345 in the resin saturation bath 340, the sheet 125 proceeds to a curing oven 360. Between the resin saturation bath 340 and the curing oven 360, a smoothing roll 350 may be used on the sheet 125 to remove excess resin 324 and smooth the sheet 125 before entering the curing oven 360. The sheet 125 in FIGS. 3 and 4 is shown as an example where the sheet 125 partially cures in the curing oven 360 (e.g., a multi-stage, multi-chamber, or variable temperature curing oven) and is then cut at a cutting station 370 and stacked or otherwise stored in curing racks 375 or other storage elements. A curing oven 360 and curing racks 375 will often only partially cure the sheet 125 saturated with resin 324 (e.g., curing to "B stage"), and the sheet 125 does not become fully cured until the sheet 125 undergoes a final heated pressing step where the sheet 125 is typically pressed together with additional sheets, porous panel products, and/or layers (e.g., decorative paper layer 130, kraft paper, overlay paper, backing layer 111, or substrate 110).

FIG. 5 depicts an alternative example where the sheet 125 is impregnated with porosity agents 150 and resin 324 twice: first in the main resin saturation bath 340, and then a second time at a second resin application step 346 positioned after the sheet 125 has partially, but not fully, cured in a first curing oven 360a. The porosity agents 150 included in resin 324 at the first saturation step 345 and the second application step 346 of resin 324 coating in FIG. 5 may use the same porosity agents 150 in both steps 345 and 346 in some implementations, but may also use different porosity agents 150 in each of steps 345 and 346. After the second resin application step 346, the sheet 125 is again partially cured (e.g., cured to "B stage") in a second curing oven 360b and may then optionally undergo additional processing 380.

The resin saturation bath 340 contains at least a resin 324 (e.g., a melamine resin) and a porosity agent 150. The porosity agent 150 may be added to the resin 324 before being added to the saturation bath 340 (as shown in FIGS. 3 and 5). The porosity agent 150 may alternatively be added directly to the to the saturation bath 340 where a resin 324 that contains no porosity agents 150 is added separately to the saturation bath 340 (as shown in FIG. 4). One or more mixers or agitators 348 may be used to mix and stir the resin 324 and/or the resin saturation bath 340 to keep the porosity agents 150 mixed and suspended rather than settling towards the bottom. An agitator 348 may include paddles or blades as shown in FIGS. 3-5, but may also be a pump, a fluid circulation system, or other circulation, mixing, or agitation system.

Figure 6:
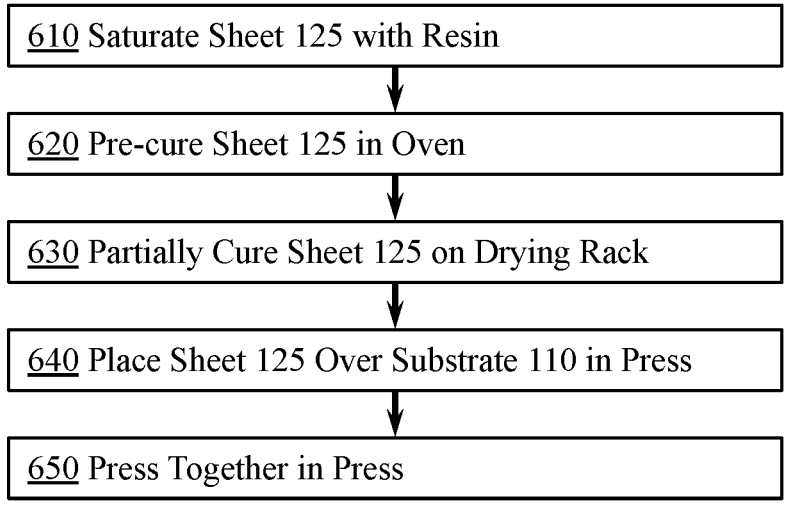
FIGS. 6-7 depict various non-limiting examples of a method of creating a stainable laminate wood or wood product.
Figure 9:
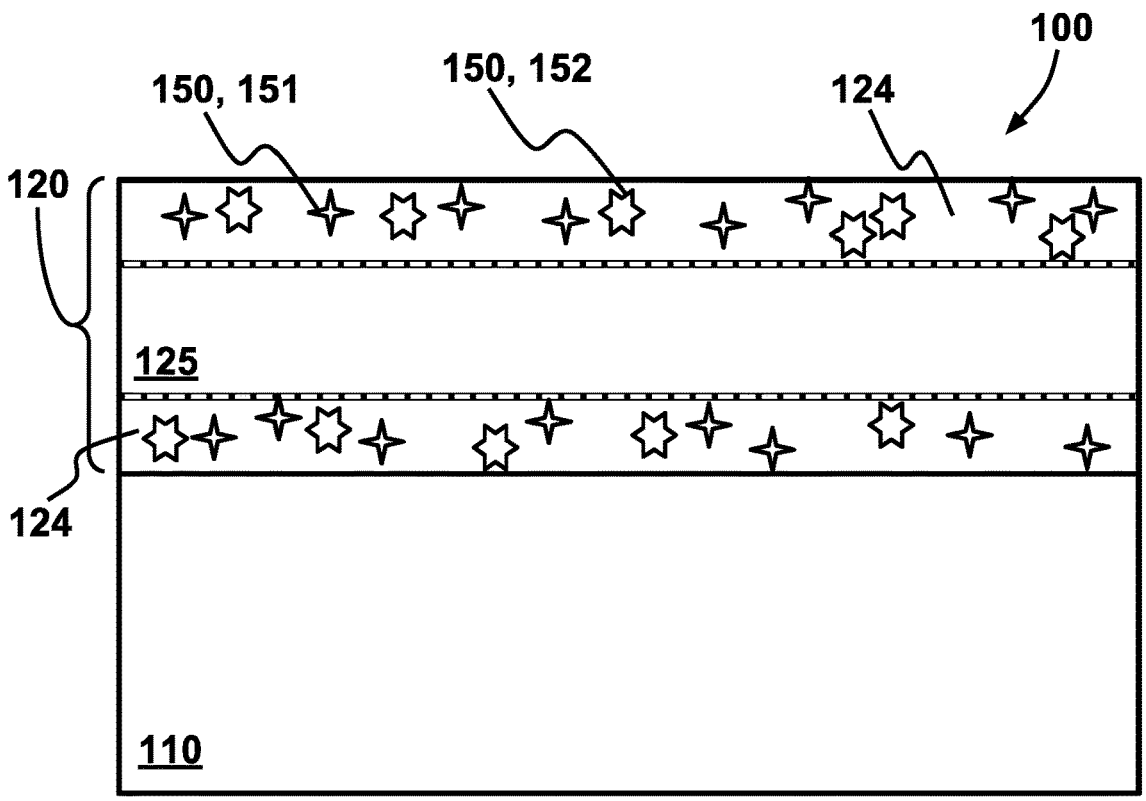

FIG. 6 provides a non-limiting example of a stainable laminate product 100 created using a thermally fused laminate (TFL) process. A sheet 125 is saturated 610 with resin binder containing at least one porosity agent 150. In this non-limiting example, the sheet 125 is a decorative paper without a translucent overlay paper above the decorative paper (although the TFL process is not limited to only decorative papers as sheet 125). The sheet 125 next enters an oven to be pre-cured 620 (e.g., at 150-170° C. for 40-180 seconds). The sheet 125 is then placed on a drying or storage rack for partial curing 630. The sheet does not finish curing on drying or storage racks. It is only cured through heat and/or pressure which create the bonding process of all layers. The sheet 125 then is placed over 640 a substrate 110 inside a press, where the substrate 110 is a porous panel product that is at least 4 mm thick (e.g., MDF or HDF instead of kraft paper or other thin substrates). Next the press uses temperature and pressure to press 650 the sheet 125 directly to the substrate 110 (e.g., at 165-190° C. for 0.3-4 minutes under 175-400 pounds-per-square-inch (psi) of pressure). FIG. 9 illustrates an example of a stainable laminate product 100 where the layers illustrated could have been formed using the TFL process as described in FIG. 6 (but FIG. 9 may also be created using other processes aside from a TFL process).

Figure 7:
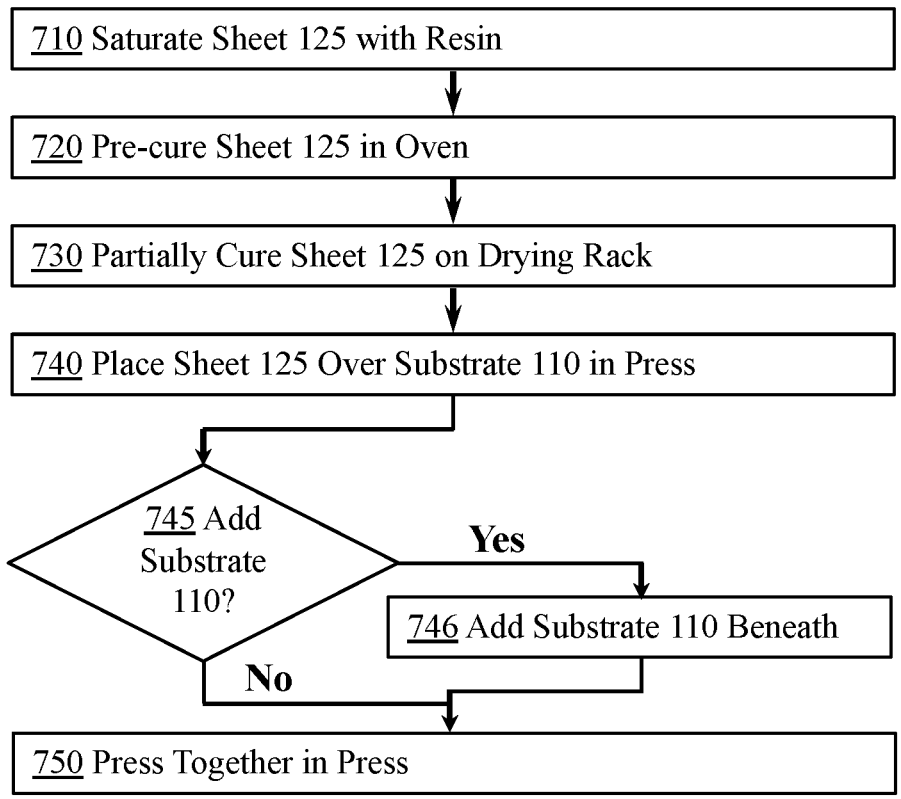
Figure 11:
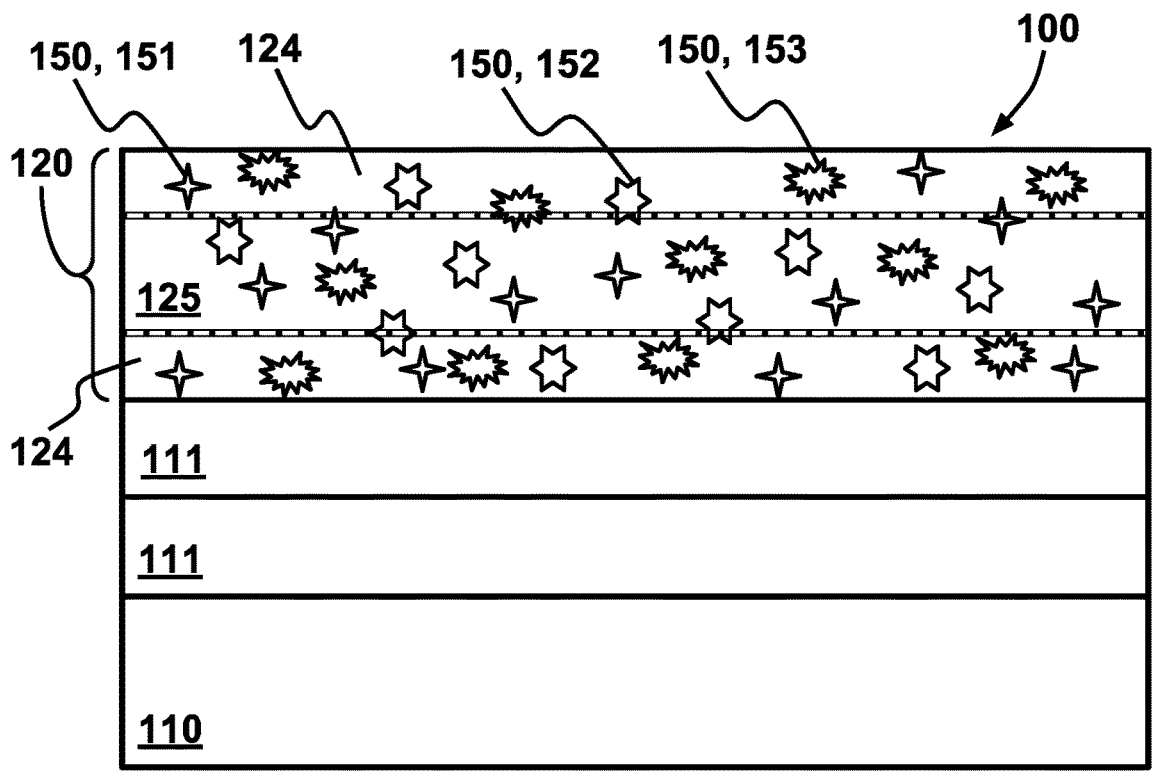

FIG. 7 provides a non-limiting example of a stainable laminate product 100 created using a high-pressure laminate (HPL) process. A sheet 125 is saturated 710 with resin binder containing at least one porosity agent 150. In this non-limiting example, the sheet 125 is a translucent overlay paper (although the HPL process is not limited to only overlay paper as sheet 125). The sheet 125 next enters an oven to be pre-cured 720 (e.g., at 260-300° C. for 100-150 seconds). The sheet 125 is then placed on a drying or storage rack for partial curing 730. The sheet does not finish curing on drying or storage racks. It is only cured through heat and/or pressure which create the bonding process of all layers. The sheet 125 then is placed 740 in a press over other layers of partially cured resin saturated papers, which include a resin saturated decorative layer and at least one resin saturated layer of kraft paper (these lower layers do not contain porosity agents 150 in this example). In some embodiments (i.e., "yes" in 745), this stack of sheet 125 and other paper sheets is also positioned 746 on top of a substrate 110 inside the press, where the substrate 110 is a porous panel product that is at least 4 mm thick (e.g., MDF or HDF instead of kraft paper or other thin substrates). Finally, the press uses temperature and pressure to press 750 the sheet 125 onto the underlying sheets of decorative paper, kraft paper, and optionally a substrate 110 (e.g., at 250-300° C. for 5-60 minutes under 800-1200 psi of pressure). FIG. 11 illustrates an example of a stainable laminate product 100 where the layers illustrated could have been formed using the HPL process as described in FIG. 7 (but FIG. 11 may also be created using other processes aside from an HPL process).

In some embodiments, the method of creating the stainable laminate product 100 comprises post application of a resin binder layer (e.g., a top-most that includes porosity agents) without saturating a sheet. Non-limiting examples of "post application" include using a mechanical application system such as a roll-coater, curtain coater, or spray application method. In preferred embodiments, the coating system contains a high percentage of porosity agents in order to allow a stain to absorb, thus allowing color retention. In non-limiting implementations, the porosity agent is in a volume % between 20%-60%.

In one aspect, a stainable laminate product comprises: a wood or wood product substrate and a sheet of paper or fiber affixed to the substrate, wherein the sheet is treated with a resin binder comprising one or more porosity agents to allow staining. In another aspect, the method of manufacturing a stainable laminate wood or wood product comprises: a) treating a sheet with a resin binder, wherein the resin binder comprises one or more porosity agents, the one or more porosity agents are in an amount of between 25 to 175 grams per square meter of the substrate; b) partially curing the sheet with heat; and c) pressing the sheet to the substrate under heat and/or pressure. In a further aspect, the method further comprises: d) applying a stain to the sheet; and e) applying a finishing coat to the sheet over the stain. Particular embodiments and implementations may comprise one or more of the following features.

The size and density of the porosity agent 150 will affect the depth of impregnation or saturation into the resin binder layer 120 and also the sheet 125 within the resin binder layer 120. The thermosetting polymer resin 124 is impregnated into one or more sheets 125 of paper (e.g., Kraft paper, decorative paper, overlay paper, etc.), fabric, linen, or fibrous material where the porosity and saturation properties of the sheet 125 can affect the depth and manner of how different porosity agents 150 embed themselves within the sheet 125. In some implementations, the sheet 125 of paper or other medium is manufactured with sufficient porosity to allow the porosity agent 150 to penetrate into and throughout the sheet 125. Porosity agent 150 with higher densities within the disclosed ranges will tend to have the ability to impregnate deeper within the sheet 125 provided these dense particles are sufficiently small to pass into interior portions of the sheet 125. A porosity agent 150 that is larger than the openings on the surface of and within the sheet 125 will not saturate deep into the sheet 125 and will rest on or close to the surface of sheet 125. Thus, the porosity and structure of a sheet 125 of paper (or other medium) can be combined with particular sizes and densities of the porosity agent 150 to result in a resin binder layer 120 impregnated with the porosity agent 150 at uniform or varying amounts depending on the depth.

In certain embodiments, there is only one sheet. The sheet is paper or fiber selected from the group consisting of: translucent paper, decorative paper, Kraft paper, overlay paper, fabric, linen, and fibrous material. In other embodiments, there is more than one sheet. Each sheet is independently selected from the group consisting of: translucent paper, decorative paper, Kraft paper, overlay paper, fabric, linen, and fibrous material. In certain embodiments, a decorative sheet comprises a design of a wood grain. In some embodiments, the sheet is saturated with the resin binder. In embodiments where there are two or more sheets, each sheet maybe treated with the same resin binder or different resin binders.

The porosity agent 150 (e.g., untreated silica particles, wax particles, mica, calcium carbonate, talc, silane, kaolin clay, crystalline silica, corn starch, feldspar, titanium dioxide, calcium oxide, wollastonite, cellulosic particles, combinations thereof, etc.) are added to the resin 324 (e.g., thermosetting polymer resin 124 and/or a thermosetting acrylic resin) before the resin 324 becomes fully reacted and rigid. The porosity agent 150 may be added to the resin 324 formulation before a catalyst is added. The porosity agent 150 may also be added to the resin 324 formulation after a catalyst is added, but before the resin 324 becomes fully reacted and rigid. Talc and untreated silica particles are preferable porosity agents 150 in some implementations for their absorption characteristics. Calcium carbonate and microcrystalline silica particles are preferable porosity agents 150 in some implementations for their characteristics. In some implementations, at least two different types of porosity agents 150 are included in the resin 324 formulation before pressing and curing the resin binder layer 120.

Particular embodiments and implementations may further comprise a phenolic backing layer having a first side and a second side opposite the first side. The first side is affixed to the substrate, and the second side is affixed to a sheet, wherein the sheet is non-opaque and/or has a decorative design. In further embodiments, the phenolic backing layer comprises paper. In further embodiments, the decorative design comprises a design of a wood grain.

In some embodiments, the stainable laminate wood or wood product further comprises a second resin binder layer, the second resin binder layer comprising a second sheet and an aqueous resin having one or more porosity agents, wherein the second resin binder layer contacts the first resin binder layer.

Existing resin binder presses may be used to press at least one stainable resin binder layer 120 onto a substrate 110, such as: Kraft paper, decorative paper, backing layer(s), foil, porous panel product, wood, engineered wood, flooring, fabric, linen, fibrous sheets, cellulose, or other surfaces where melamine laminate layers are used. Existing resin binder presses may be used, for example, by including porosity agents 150 to the thermosetting polymer resin 124 formulation before pressing and curing the resin binder layer 120 in the melamine press. The porosity agents 150 may be added to a thermosetting polymer resin 124 formulation that is then pressed using either textured or non-textured pressing plates (e.g., caul plates) using any one of a variety of laminate pressing methods. The resin binder layer 120 containing the porosity agent(s) 150 results in a stainable resin binder layer 120 where a wood stain, colorant, or stain can embed itself into the stainable resin binder layer 120 because of the porosity provided by the porosity agent 150.

After staining the stainable resin binder layer 120, a finishing coating may be applied on top to seal the porous (and stainable) top resin binder layer 120 of the stainable resin binder product 100. Failing to seal and apply a finishing coating to the stainable laminate product 100 creates the risk of accidentally staining the stainable resin binder layer 120 with food, dirt, or other contaminants. Thus, the stainable laminate product 100 behaves similar to a traditional wood product that is sealed after being stained to prevent inadvertent staining in the future.

Referring generally to FIGS. 8-13, a stainable resin binder layer 120 including at least one porosity agent 150 (e.g., untreated silica particles, wax particles, mica, talc, etc.) may be affixed to a substrate 110, such as: a backing layer, a porous panel product, or other natural or synthetic substrate products as described throughout this disclosure. The stainable resin binder layer 120 includes porosity agents 150 and thermosetting polymer resin 124 impregnated in any one of a variety of different sheets 125 including, for example: decorative paper, Kraft paper, overlay paper, cellulose paper, foil, nylon, rayon, wood pulp, wood veneer, linen, fabric, or other papers or fibers for use in laminates or with thermosetting polymer resin 124. The stainable resin binder layer 120 may be affixed to a variety of products that conventionally use wood stains (e.g., cabinetry, wood products, flooring, siding, furniture, shelving, etc.) and products that do not currently use wood stains (e.g., staining a non-wood product or using a non-traditional stain on wood or non-wood products). In certain preferred implementations, the stainable resin binder layer 120 is affixed to porous panel products, cabinetry, furniture materials, boards, flooring, or engineered wood products. A stainable resin binder layer 120 that has been partially or fully cured may be post formed into various curved or bent shapes.

The resin binder layer 120 may contain two or more different types of porosity agents 150 mixed in varying amounts depending on the implementation. The resin binder layer 120 may contain a single type of porosity agent 150 (see FIG. 8), two different types of porosity agents 150 (see FIG. 9), three different types of porosity agents 150 (see FIGS. 2 & 11), or four or more different types of porosity agents 150 (not shown). For example, the stainable laminate product 100 shown in FIG. 2 may include the following combination of porosity agents 150 (by volume of just the porosity agents 150): 55% untreated silica particles; 20% wax particles; and 25% mica. The stainable resin binder layer 120 may also contain more than one size of the same type of porosity agent 150, such as: different sizes of a single porosity agent 150 (see FIG. 10); different sizes of each porosity agent 150 within a resin binder layer 120 having multiple types of porosity agents 150 (not shown); or different sizes of a single porosity agent 150 within a resin binder layer 120 having multiple types of porosity agents 150 (not shown). In some implementations, the sheet 125 in resin binder layer 120 is impregnated with between 4 and 8 different types of porosity agents 150. Any combination of different types, amounts (by volume or weight), and/or sizes of the disclosed porosity agents 150 and their equivalents may be used within at least one resin binder layer 120 of the stainable laminate product 100.

Figure 8:
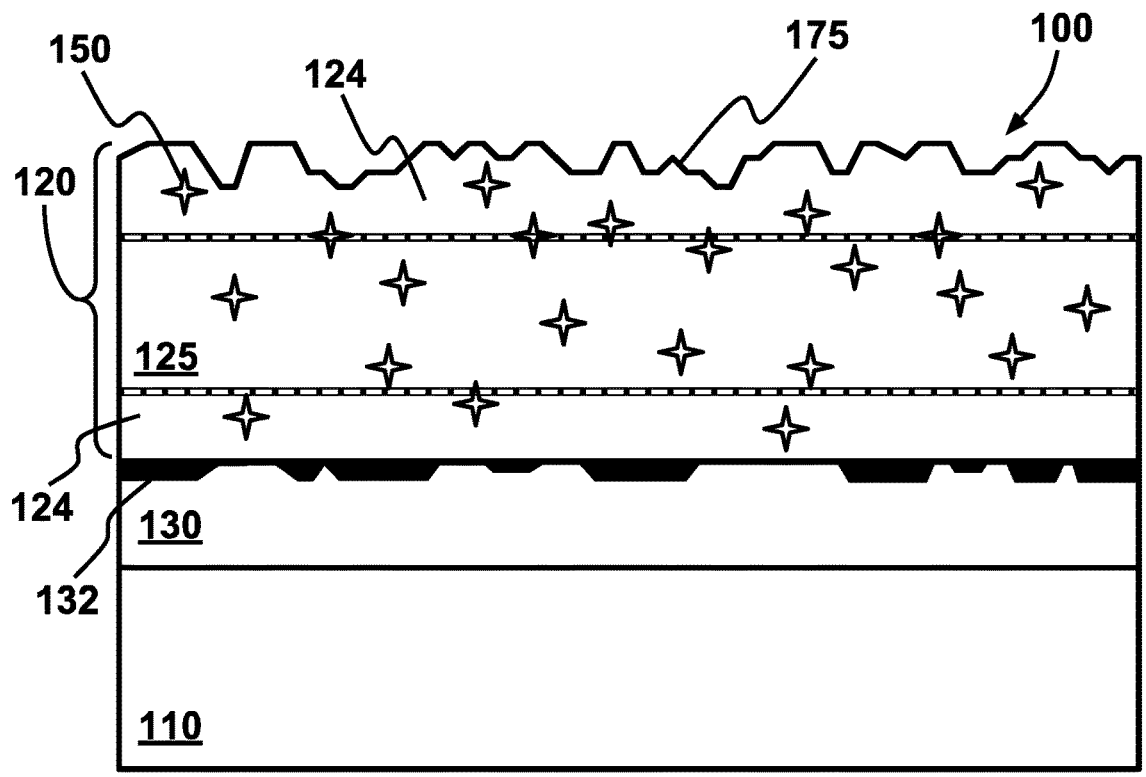
FIGS. 8-13 depict various non-limiting examples of a stainable laminate wood or wood product.
Figure 12:
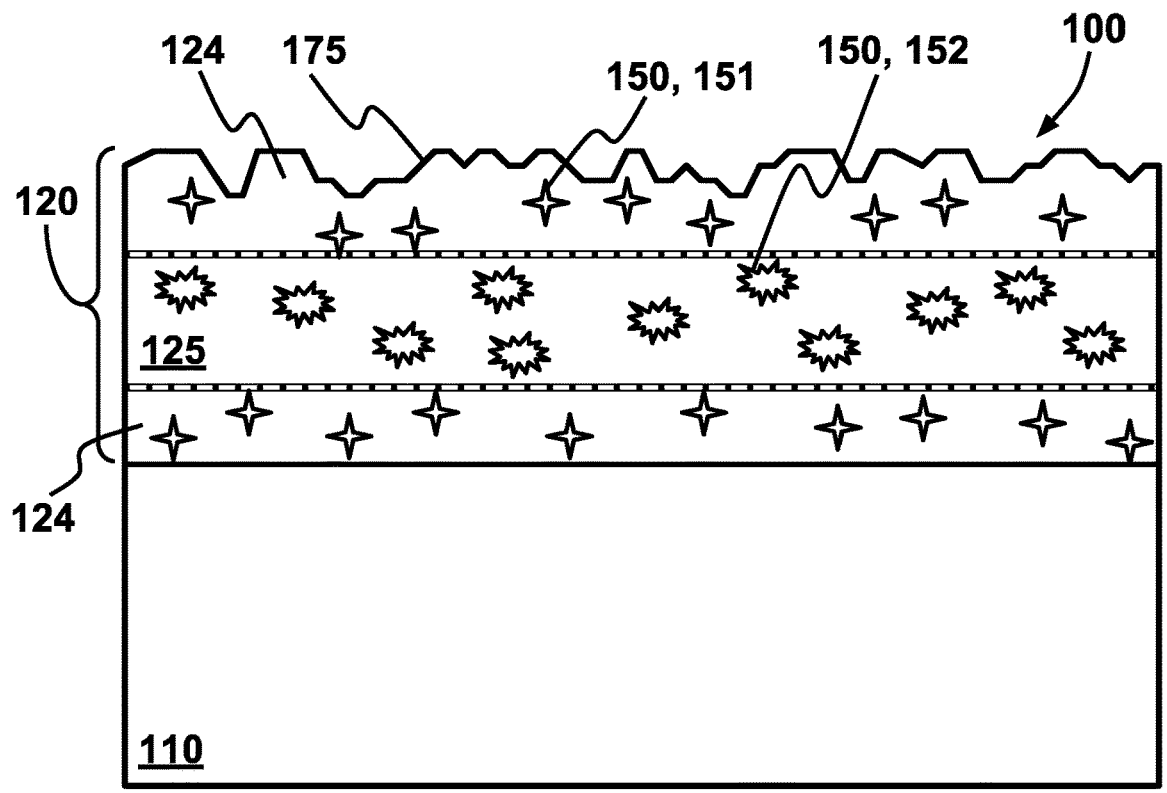

In the non-limiting example of FIG. 8, the material used for the sheet 125 has a sufficiently porous structure that the porosity agent 150 saturate and penetrate into sheet 125. However, in the non-limiting example of FIG. 9, the material used for the sheet 125 is not sufficiently porous to permit the porosity agent types 151 and 152 to saturate and penetrate into sheet 125, thus all of the porosity agents 150 in FIG. 9 are confined to the space above and below the sheet 125. FIG. 12 depicts a non-limiting example of a sheet 125 that has been impregnated with or manufactured to contain one or more porosity agents 150 before being saturated in a resin saturation bath 340. Thus, porosity agent 152 of FIG. 12 is already present in the sheet 125 when the sheet is saturated in the resin saturation bath 340 to add the resin 324 and the porosity agent 151.

Figure 13:
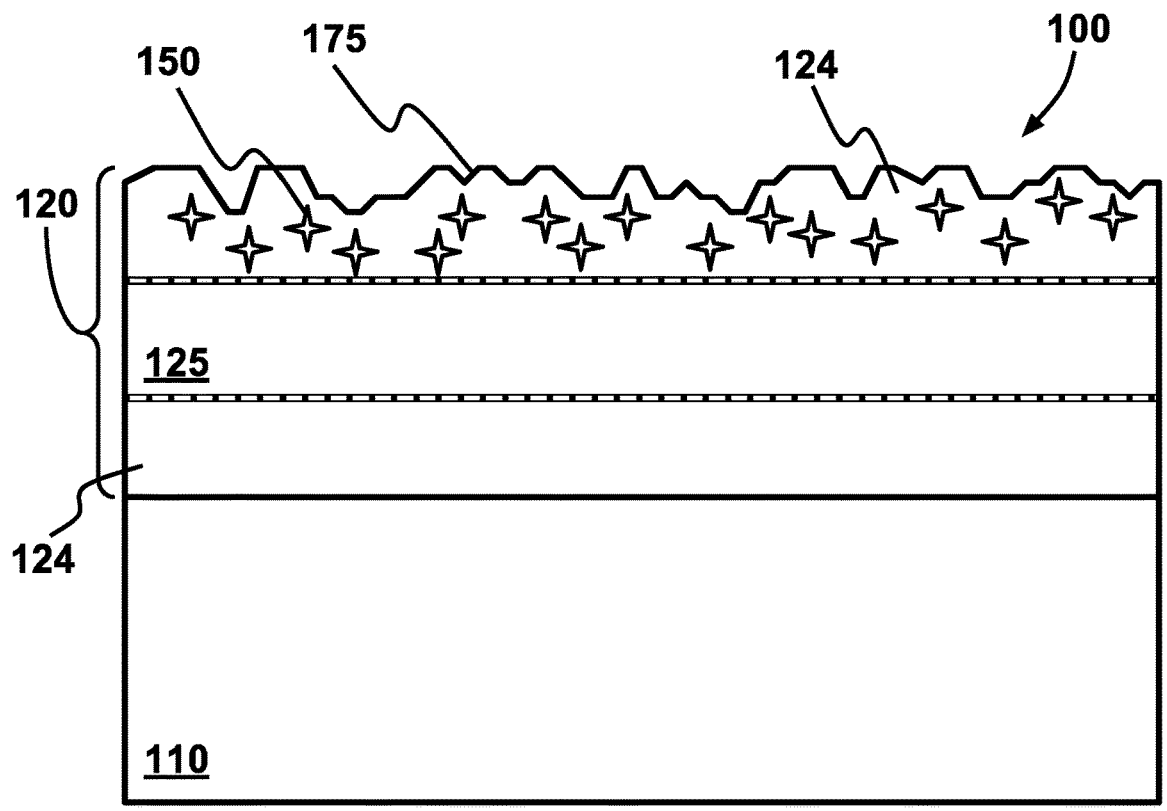

In some embodiments, the thermosetting polymer resin 124 is deposited only on the top surface of the sheet 125. Existing manufacturing techniques allow a resin binder layer to be deposited on top of a sheet of paper. FIG. 13 depicts a non-limiting example of where the thermosetting polymer resin 124 containing porosity agents 150 is deposited only on the top surface of the sheet 125, which results in the porosity agent 150 residing on top of the sheet 125, but not below the sheet 125.

In numerous implementations, a backing layer 111 is applied to the resin binder layer 120. The backing layer 111 may serve one or more of the following purposes: promote adhesion between a porous panel product and the adjacent resin binder layer 120; stiffen the stainable resin binder layer 120; omit one or more steps (e.g., etching or sanding) involved in preparing the porous panel product for adhering to the adjacent resin binder layer 120; show decorative designs and/or colors through non-opaque resin binder layer(s) 120; or provide a smooth surface for laminate melamine adhesion. The backing layer 111 may be a sheet coated or saturated in a phenolic resin, such as a sheet of paper or Kraft paper soaked in phenolic resin or phenol formaldehyde resin. Multiple backing layers 111 of the same or different types may be affixed between the substrate 110 (e.g., a porous panel product) and the stainable resin binder layer 120 (e.g., see FIG. 11). A backing layer 111 is not limited to using sheets of paper, and various natural fibers (e.g., wood, pulp, cotton, ground coconut shells, ground corn stocks, etc.) and/or synthetic fibers or sheets (e.g., plastics, nylon, fiberglass reinforced plastic, etc.) may be used as a backing layer 111. Similarly, a backing layer 111 is not limited to using phenolic resins.

Figure 10:
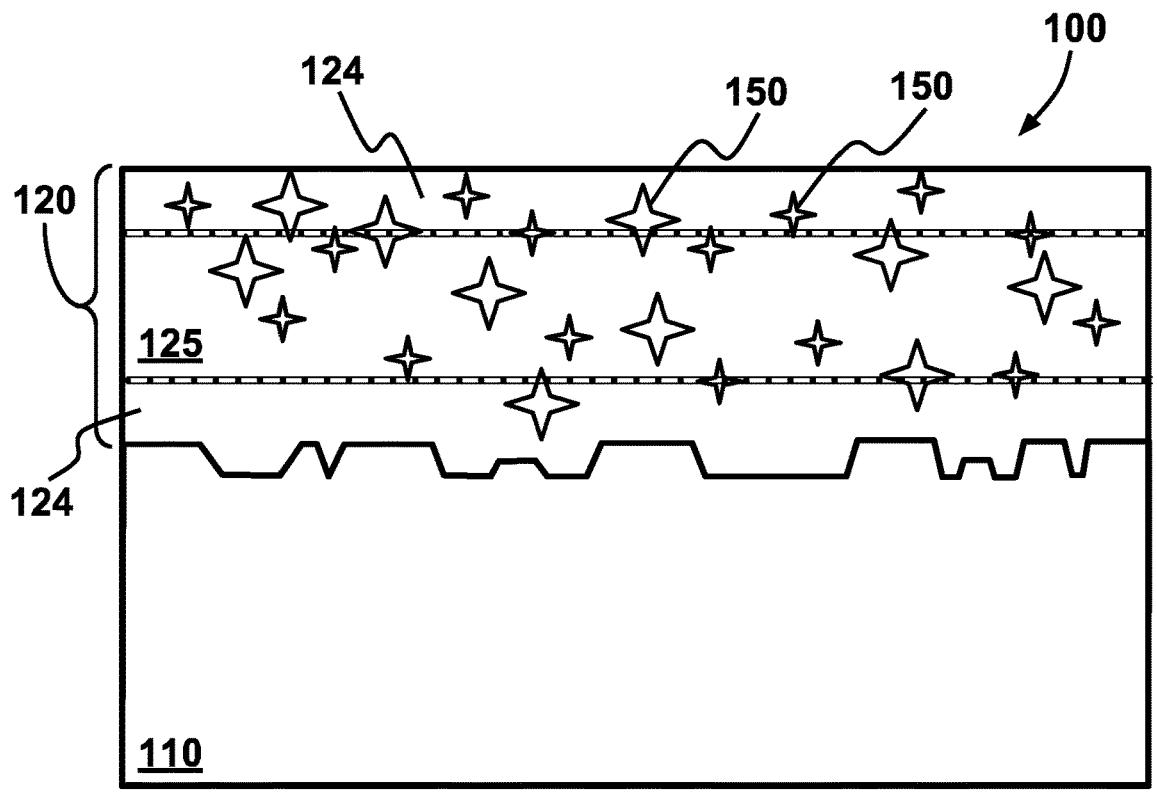

In some implementations, decorative designs may be printed, deposited, etched, carved, scored, sanded, stamped, engraved, embossed, burned, fixed, and/or marked on one or more of a decorative paper layer, Kraft paper, a backing layer 111, or directly on a substrate 110 or core (e.g., a porous panel product). In some implementations, surface embossing or other variations are introduced with a textured caul plate or an embossed sacrificial layer in a melamine press. FIGS. 2 and 8 depict non-limiting examples of a decorative paper layer 130 (e.g., a design printed as a printed layer 132 on the decorative paper) that may be saturated with melamine, thermosetting acrylic, phenolic, urea formaldehyde, or other laminating resins. FIG. 9 depicts a non-limiting example of a design printed as a printed layer directly on a porous panel product (or another substrate 110 or core) with a backing layer 111 and decorative paper layer 130 omitted. FIG. 10 depicts a non-limiting example of a textured design etched (e.g., sanded, laser-etched, carved, etc.) directly on a substrate 110. The decorative design may include any one or more of various different colors within a color space (including hue, saturation, and lightness). The decorative design may also be as simple as a single color with nothing printed or etched thereon. These decorative designs may mimic natural products (e.g., wood, wood veneers, fibers, plants, etc.), geometric shapes or patterns, artistic designs, or other designs according to consumer taste and demand. If a decorative design is printed, etched, or otherwise used, then the resin binder layer(s) 120 above the decorative design will have at least a degree of transparency (e.g., using translucent overlay paper) so that the decorative design is visible or otherwise changes the appearance of the stainable laminate product 100. In some implementations the decorative design mimics a wood grain. In certain preferred implementations the decorative design mimics a wood grain where the saturation and/or lightness is adjusted so that the colors used produce a wood grain design that allows the wood stain or colorant that is subsequently added to the stainable resin binder layer 120 to adjust the final look of the color.

In some implementations, the stainable resin binder layer 120 has a textured surface 175 (e.g., see FIGS. 8, 12, and 13). The textured surface 175 may primarily serve as a decorative element to enhance the look or feel of the stainable laminate product 100. The textured surface 175 allows for deeper penetration of the stain into the recessed portions of the surface, thereby providing additional visual depth to the stained surface. The textured surface 175 may be added using textured pressing plates of a melamine press (e.g., caul plates, embossed sacrificial sheets or foils, or the like), and may be implemented using either high pressure or low-pressure melamine press configurations. In some implementations, the textured surface 175 may also be formed after pressing the melamine and etching or otherwise texturing the melamine (and before the thermosetting polymer resin 124 fully cures or hardens). The texture may also be applied through a method of roller application in which the graining pattern is applied through pressure in a continuous embossing process. The textured surface 175 may be used with any combination of: decorative designs (i.e., including colors) on the backing and/or decorative paper; multiple layers of resin binder (both stainable resin binder layers 120 and conventional resin binder layers); or multiple layers of backing, substrates, overlay papers, and/or decorative paper. The textured surface 175 may also be used on a stainable resin binder layer 120 above a conventional resin binder layer containing an overlay, decorated or undecorated paper or foil, or other paper.

A stainable laminate product 100 may include a plurality of resin binder layers 120 and/or a plurality of decorative paper layers 130, backing layers 111, cores, or substrates 110. Multiple backing layers 111 or substrates 110 may be used (as mentioned above) and one or more of these backing layers 111 can be or contain a decorative paper layer 130 (e.g., a decorative paper, a textured or embossed paper, a printed backing, and so forth). In some implementations, the stainable laminate product 100 includes two or more layers of resin binder stacked one atop the other. In some implementations, at least the top-most layer is a stainable resin binder layer 120 that includes at least one type of porosity agent 150. The stainable laminate product 100 may contain a traditional or standard resin binder layer (e.g., providing strength and/or sealing benefits) positioned below a stainable resin binder layer 120 that includes at least one type of porosity agent 150 enabling a wood stain, colorant, or stain to embed into the second resin binder layer 120. The stainable laminate product 100 may also include different porosity agents 150 depending on the resin binder layer 120, such as a first stainable resin binder layer 120 having only one type of porosity agent 150 while a second stainable resin binder layer 120 has multiple types of porosity agents 150. In some implementations a layer of resin binder includes one or more porosity agents 150 that are embedded or deposited only in an upper portion of the resin binder layer 120 (as shown in FIG. 13).

In certain preferred implementations, the stainable laminate product 100 includes a textured surface 175 formed by a textured pressing plate of a resin binder press on a substrate affixed to a decorative paper and one to three non-opaque resin binder layers 120 containing at least one type of porosity agent 150. In some implementations, the stainable laminate product 100 includes a substrate affixed to a first side of a backing layer 111 having a decorative paper on a second side of the backing layer 111, and at least one non-opaque resin binder layer 120 affixed to the decorative paper, wherein at least the top-most resin binder layer 120 contains at least one type of porosity agent 150 and has a textured surface 175. In certain implementations, the stainable laminate product 100 includes a backing layer 111, where a decorative paper is fixedly sandwiched between the backing layer 111 and one to three non-opaque resin binder layers 120, where the top-most resin binder layer 120 contains at least one type of porosity agent 150 and has a textured surface 175.

One or more thermosetting resins maybe used for the resin binder layer 120, including melamine-formaldehyde resins, urea-formaldehyde resins, a combination of melamine-formaldehyde and urea-formaldehyde resins, polyurethane resins, polyester resins, or acrylic resins. The resin binders may be commercially available.

Although many laminate products currently use a melamine-impregnated top-most layer (e.g., overlay paper(s) or decorative paper), the ability to make the top-most layer of a laminate product stainable by adding porosity agents 150 as disclosed is not limited to only layers impregnated with thermosetting polymer resin 124. For example, a urea-impregnated top-most layer or a melamine/urea-impregnated top-most layer. In certain embodiments having only one layer of a resin binder, Melamine-formaldehyde resin or a combination of urea- and melamine-formaldehyde resin, for example, will typically be used.

The present invention is further illustrated by the Figures and Claims that should not be construed as limiting. The contents of all references, patents, and published patent applications cited throughout this application, as well as the Figures, are incorporated herein by reference in their entirety for all purposes.

EXAMPLES

TABLE 1

A Non-Limiting Melamine Formulation

| | | | Formula | | Total Solids | |
|---|---|---|---|---|---|---|
| % NV | Kilograms Per Gallon | Material Name | Weight (kg) | Volume Gallons | Weight (kg) | Volume Gallons |
| 55.0% | 4.72 | Melamine Resin | 377.84 | 80.00 | 207.81 | 44.00 |
| 75.0% | 4.16 | Wetting Agent | 2.27 | 0.55 | 1.70 | 0.41 |
| 50.0% | 4.16 | Release Agent | 1.36 | 0.33 | 0.68 | 0.16 |
| 0.0% | 3.78 | Water | 30.39 | 8.04 | 0.00 | 0.00 |
| 75.0% | 4.16 | Catalyst | 2.27 | 0.55 | 1.70 | 0.41 |
| 70.0% | 3.97 | Plasticizer | 3.18 | 0.80 | 2.22 | 0.56 |
| 100.0% | 10.20 | Calcium Carbonate | 250.38 | 24.54 | 250.38 | 24.54 |
| 100.0% | 10.01 | Microcrystalline Silica | 166.92 | 16.67 | 166.92 | 16.67 |

TABLE 2

A Non-Limiting Urea Formulation

| | | | Formula | | Total Solids | |
|---|---|---|---|---|---|---|
| % NV | Kilograms Per Gallon | Material Name | Weight (kg) | Volume Gallons | Weight (kg) | Volume Gallons |
| 60.0% | 4.99 | Urea Formaldehyde Resin | 377.84 | 75.73 | 226.71 | 45.44 |
| 0.0% | 3.78 | Water | 37.65 | 9.96 | 0.00 | 0.00 |
| 75.0% | 4.16 | Surfactant | 0.41 | 0.10 | 0.31 | 0.07 |
| 75.0% | 4.16 | Catalyst | 2.27 | 0.55 | 1.70 | 0.41 |
| 70.0% | 3.97 | Plasticizer | 4.54 | 1.14 | 3.18 | 0.80 |
| 100.0% | 10.20 | Calcium Carbonate | 253.56 | 24.86 | 253.56 | 24.86 |
| 100.0% | 10.01 | Microcrystalline Silica | 168.74 | 16.86 | 168.74 | 16.86 |

TABLE 3

A Non-Limiting Melamine (20%)/Urea (80%) Formulation

| | | | Formula | | Total Solids | |
|---|---|---|---|---|---|---|
| % NV | Kilograms Per Gallon | Material Name | Weight (kg) | Volume Gallons | Weight (kg) | Volume Gallons |
| 60.0% | 4.99 | Urea Formaldehyde Resin | 605.09 | 121.27 | 363.06 | 72.76 |
| 55.0% | 4.72 | Melamine Resin | 164.65 | 34.86 | 90.56 | 19.17 |
| 0.0% | 3.78 | Water | 75.30 | 19.93 | 0.00 | 0.00 |
| 75.0% | 4.16 | Surfactant | 0.82 | 0.20 | 0.61 | 0.15 |
| 75.0% | 4.16 | Catalyst | 4.54 | 1.09 | 3.40 | 0.82 |
| 70.0% | 3.97 | Plasticizer | 9.07 | 2.29 | 6.35 | 1.60 |
| 100.0% | 10.20 | Calcium Carbonate | 522.49 | 51.22 | 522.49 | 51.22 |
| 100.0% | 10.01 | Microcrystalline Silica | 348.31 | 34.79 | 348.31 | 34.79 |

TABLE 4

A Non-Limiting Melamine (80%)/Urea (20%) Formulation

| | | | Formula | | Total Solids | |
|---|---|---|---|---|---|---|
| % NV | Kilograms Per Gallon | Material Name | Weight (kg) | Volume Gallons | Weight (kg) | Volume Gallons |
| 60.0% | 4.99 | Urea Formaldehyde Resin | 151.50 | 30.36 | 90.90 | 18.22 |

TABLE 4-continued

A Non-Limiting Melamine (80%)/Urea (20%) Formulation

| | | | Formula | | Total Solids | |
|---|---|---|---|---|---|---|
| % NV | Kilograms Per Gallon | Material Name | Weight (kg) | Volume Gallons | Weight (kg) | Volume Gallons |
| 55.0% | 4.72 | Melamine Resin | 659.98 | 139.74 | 362.99 | 76.85 |
| 0.0% | 3.78 | Water | 75.30 | 19.93 | 0.00 | 0.00 |
| 75.0% | 4.16 | Surfactant | 0.82 | 0.20 | 0.61 | 0.15 |
| 75.0% | 4.16 | Catalyst | 4.54 | 1.09 | 3.40 | 0.82 |
| 70.0% | 3.97 | Plasticizer | 9.07 | 2.29 | 6.35 | 1.60 |
| 100.0% | 10.20 | Calcium Carbonate | 522.49 | 51.22 | 522.49 | 51.22 |
| 100.0% | 10.01 | Microcrystalline Silica | 348.31 | 34.79 | 348.31 | 34.79 |

What is claimed is:

1. A stainable laminate wood product, comprising:
a substrate; and
a stainable resin binder layer laminated to only the top surface of the substrate with heat and pressure, the stainable resin binder layer comprising a top-most resin binder layer, wherein at least the top-most resin binder layer comprises a sheet of paper or fiber, and a stainable resin binder formulation, the stainable resin binder formulation comprising:
thermosetting acrylic resins, thermosetting polymer resins, or combinations thereof, and
one or more porosity agents, wherein the one or more porosity agents includes at least one porosity agent selected from the group consisting of: kaolin clay; corn starch; talc; mica; calcium carbonate; cellulosic particles; wax particles; sodium oxide; potassium oxide; precipitated calcium carbonate; wollastonite; and combinations thereof,
wherein the sheet is saturated with the stainable resin binder formulation,
wherein the resin binder layer is laminated to the substrate at 165-190° C. for 0.3-4 minutes under 175-400 pounds per square inch of pressure,
wherein the stainable resin binder formulation comprises at least 30 weight percent of the one or more porosity agents before curing; at least one thermosetting polymer resin; and one or more melamine-formaldehyde resins at between 15 and 50 weight percent of the stainable resin binder formulation before curing, and between 5 and 15 weight percent of urea-formaldehyde resins, before curing; and
wherein the substrate is selected from the following: wood, engineered wood, and porous panel product.

2. The stainable laminate product of claim 1, wherein the resin binder layer further comprises at least a second porosity agent selected from the group consisting of: aluminum oxide, calcium carbonate, calcium oxide, cellulosic particles, corn starch, crystalline silica, feldspar, iron oxides, kaolin clay, mica, microcrystalline silica, Nepheline Syenite, potassium oxide, precipitated calcium carbonate, silane, silicon dioxide, silicate minerals, sodium oxide, talc, titanium dioxide, untreated silica particles, wax particles, and wollastonite.

3. The stainable laminate product of claim 1, wherein the stainable resin binder formulation comprises between 30 and 75 weight percent of the one or more porosity agents before curing, and/or between 45 and 85 weight percent of the one or more porosity agents after curing.

4. The stainable laminate product of claim 1, wherein the one or more porosity agents comprises a mineral with a density of between 0.9 to 3.8 g/cm$^3$ and/or a size of between 0.01 and 85 μm.

5. The stainable laminate product of claim 1, wherein the stainable resin binder formulation has a pigment volume concentration of between 25% and 85%.

* * * * *